United States Patent
Obonai et al.

(10) Patent No.: US 6,615,539 B1
(45) Date of Patent: Sep. 9, 2003

(54) WATER-RETAINING SUPPORT FOR PLANTS AND PLANT BODY-GROWING WATER-RETAINING MATERIAL

(75) Inventors: Yasuhiro Obonai, Enzan (JP); Koji Furukawa, Enzan (JP); Hiroshi Yoshioka, Tokyo (JP); Yuichi Mori, Tokyo (JP); Kazuhiro Kasuya, Kyoto (JP)

(73) Assignees: M&M Laboratory Co., Ltd., Yamanashi (JP); Sanyo Chemical Industries, Ltd., Kyoto (JP)

( * ) Notice: Subject to any disclaimer, the term of this patent is extended or adjusted under 35 U.S.C. 154(b) by 0 days.

(21) Appl. No.: 09/831,257

(22) PCT Filed: Nov. 5, 1999

(86) PCT No.: PCT/JP99/06187

§ 371 (c)(1), (2), (4) Date: Aug. 13, 2001

(87) PCT Pub. No.: WO00/27180

PCT Pub. Date: May 18, 2000

(30) Foreign Application Priority Data

| Nov. 6, 1998 | (JP) | ............................................. 10-316440 |
| Jan. 28, 1999 | (JP) | ............................................. 11-020394 |
| Feb. 26, 1999 | (JP) | ............................................. 11-050305 |
| Oct. 13, 1999 | (JP) | ............................................. 11-290552 |

(51) Int. Cl.⁷ ................................................. A01G 31/00
(52) U.S. Cl. ................................ 47/62 N; 47/63; 47/64; 71/36
(58) Field of Search ........................... 47/62 N, 63, 64; 71/36; 423/311

(56) References Cited

U.S. PATENT DOCUMENTS

| 3,831,317 | A | * | 8/1974 | Porte ........................ 47/58.1 R |
| 3,928,406 | A | * | 12/1975 | Leeper et al. ................ 504/193 |
| 4,977,192 | A | * | 12/1990 | Martineu et al. ........... 521/149 |
| 5,382,270 | A | * | 1/1995 | Graham et al. ............... 47/48.5 |
| 5,451,242 | A | * | 9/1995 | Ming et al. .................. 423/311 |
| 5,554,391 | A | * | 9/1996 | Ohkouchi et al. ........... 424/633 |
| 5,827,743 | A | | 10/1998 | Tanzawa |
| 6,032,409 | A | | 3/2000 | Obonai et al. |
| 6,286,254 | B1 | | 9/2001 | Obonai et al. |
| 6,397,520 | B1 | * | 6/2002 | Kosinski ........................ 47/64 |

FOREIGN PATENT DOCUMENTS

| EP | 700883 | A1 | * | 3/1996 | ............ C05F/11/00 |
| GB | 2216512 | A | * | 10/1989 | ............ C05G/3/00 |
| JP | 57-44627 | | | 3/1982 | |
| JP | 59-62665 | | | 4/1984 | |
| JP | 59-189103 | | | 10/1984 | |
| JP | 60-14745 | | | 8/1985 | |
| JP | 60-147475 | | | 8/1985 | |
| JP | 60-163956 | | | 8/1985 | |
| JP | 61-257235 | | | 11/1986 | |
| JP | 02-077487 | | | 3/1990 | |
| JP | 03-014809 | | | 1/1991 | |
| JP | 6-287220 | | | 10/1994 | |
| JP | 62-87220 | | | 10/1994 | |
| JP | 7-33818 | | | 2/1995 | |
| JP | 70-33818 | | | 2/1995 | |
| JP | 8-266147 | | | 10/1996 | |
| JP | 9-78050 | | | 3/1997 | |
| JP | 09-078050 | | | 3/1997 | |
| JP | 10-191777 | | | 7/1998 | |

OTHER PUBLICATIONS

K. Kawashima et al., "Influences of Highly Water–Absorbing Polymers Materials on Initial Growth of Crops," Sand Dune Research, 31(1), 1–8, 1984 (On Order).

Y. Sugimura et al., "Utilization of Highly Water–Absorbing Polymer as Virescence Engineering Material," Techniques of Virescence Engineering, 9(2), 11–15, 1983 (On Order).

T. Nakanishi, Bioscience & Industry, 52(8), 623–624, 1994 (On Order).

S. E. Taiyo, "Outline of Plant Nutrition Science," p 118, Yokendo Co., Ltd., 1974 (On Order).

S. Kamisaka, "Introduction to Life Science of Plants," P138, Baifukan, Co., Ltd., 1991 (On Order).

N. B. Higinbotham et al., Plant Physiol. *42*, 37, 1967 (On Order).

K. Kawashima et al., "Influences on the early growth of vegetables by a super absorbent wilh cross–linked forms of polyacrylate," Sand Dune Research Institute, 31(1), 1984, pp 1–8, (with partial English translation, 3 pgs.).

Y. Sugimura et al., "Utilization of High Water–Absorptive Polymers as Greening Engineering Material," Techniques of Virescence Engineering, 9(2), 1983, pp 11–15 (with partial English translation, 1 page).

T. Nakanishi, "Seen Bioscience", Bioscience & Industry, 52(8), 1994, pp 623–624 (with English translation, 1 page).

S. E. Taiyo, "An Outline of Plant Dietetics,"Yokendo Co., Ltd., 1974, pp 118–120 (with partial English translation, 2 pgs.).

(List continued on next page.)

*Primary Examiner*—Charles T. Jordan
*Assistant Examiner*—Bret Hayes
(74) *Attorney, Agent, or Firm*—Christie, Parker & Hale, LLP

(57) ABSTRACT

A water-retaining support for plants comprising a hydrogel-forming polymer (A) having a calcium ion absorption of 0–100 mg per 1 g of the dry weight thereof, having a chlorine ion content of 0.07–7 mmol per 1 g of the dry weight thereof and having a water absorption magnification in ion-exchanger water at 25° C. of $1.0 \times 10^1$ to $1.0 \times 10^2$; or a plant body-growing water-retaining material comprising a molded product of a mixture of such a polymer (A) and a plant body-growing support (B). The water-retaining support for plants and the plant body-growing water-retaining material are those which have an excellent water-retaining property and they substantially do not cause inhibition of root generation or inhibition of root elongation.

24 Claims, No Drawings

OTHER PUBLICATIONS

Kamisaka, S., "Introduction to Life Science of Plants", Baifukan, Co., Ltd, 1991, p. 138 (with partial English translation of relevant part).

Higinbotham, N., et al., "Mineral Ion Contents and Cell Transmembrane Electropotentials of Pea and Oat Seedling Tissue", Plant Physiology, 42, 1967, pp. 37–46.

* cited by examiner

WATER-RETAINING SUPPORT FOR PLANTS AND PLANT BODY-GROWING WATER-RETAINING MATERIAL

CROSS-REFERENCE TO RELATED APPLICATION

This application claims priority of International application No. PCT/JP99/06187, filed Nov. 5, 1999, which in turn claims priority to Japanese patent Application No. 10/316440, filed on Nov. 6, 1998, Japanese patent Application No. 11/20394, filed on Jan. 28, 1999, Japanese patent Application No. 11/50305, filed on Feb. 26, 1999, and Japanese patent Application No. 11/290552, filed on Oct. 13, 1999.

TECHNICAL FIELD

The present invention relates to a water-retaining support (or carrier) for plants and a plant body-growing water-retaining material which can support or hold a plant at the time of the growth of the plant and can also function as a source for supplying water to the plant. More specifically, the present invention relates to a water-retaining support for plant and plant body-growing water-retaining material which can supply water to a plant without inhibiting the growth of the plant, when the support is used as a water-retaining support for fluid seeding (or seeding using a fluid), farm cultivation, field (or bare ground) cultivation, virescence (or greening) engineering, etc.

BACKGROUND ART

Polycarboxylic acid-type highly water-absorbing resins, especially polyacrylic acid-type polymers, which have been used in a large quantity for diapers, menstrual goods, etc., are also used in the field of agriculture due to their inexpensiveness and excellent water-retaining ability.

For example, hydrogels of the polyacrylic acid-type polymers have been used as a support for fluid seeding; or a water-retaining support for virescence engineering, water-saving cultivation, or cultivation on sandy soil, by utilizing their water-retaining ability.

However, it has been recognized that the conventional polyacrylic acid-type hydrogels affect the growth of a plant, and particularly, they cause a marked inhibition of the root origination and root elongation when the hydrogels are used in an amount exceeding their appropriate amount (Kazuo Kawashima, et al., "Influences on The Early Growth of Vegetables by a Super Absorbent With Cross-linked Forms of Polyacrylate," Sand Dune Research Institute, 31(1), 1–8, 1984).

Particularly, when the conventional polyacrylic acid-type hydrogel is used as a support for tissue culture, a support for fluid seeding, and a support for virescence engineering, a plantlet, seed, etc., of a plant is caused to directly contact the high-concentration polyacrylic acid-type hydrogel, and therefore its root origination and root elongation are markedly inhibited, whereby the use of the polyacrylic acid-type hydrogel is severely restricted.

It has also been recognized that, in a case where the conventional polyacrylic acid-type hydrogen is used as a water-retaining support for farm or field cultivation, the elongation of the root is inhibited when the concentration of the polymer in the vicinity of the root is increased so as to enhance the effect of the water-retaining support.

As an example of the phenomenon such that the above-mentioned hydrogel comprising a polyacrylic acid-type resin markedly inhibits the growth of a plant, there has been reported an experiment wherein distilled water was absorbed into a crosslinked sodium polyacrylate so as to form a hydrogel, and the thus obtained hydrogel was caused to contact seeds of cucumbers and kidney beans for respective periods of time (3, 6, 9, 12, 24 and 48 hours), and then the states of the germination and root origination of the seeds were observed (Kazuo Kawashima, et al., "Influences on The Early Growth of Vegetables by a Super Absorbent With Cross-linked Forms of Polyacrylate," Sand Dune Research Institute, 31(1), 1–8, 1984).

As a result of such experiments, it has been reported that the growth of roots was markedly suppressed in the case of cucumber seeds, when they are caused to contact the hydrogel for 36 to 48 hours, and that the inhibition of root growth was also observed in the case of kidney beans. Further, it has been reported that the α-naphthylamine-oxidizing ability of the root was markedly reduced when the root is caused to contact the above-mentioned hydrogel for 5 hours or more. In this report, such growth inhibition and functional hindrance are presumably attributable to a fact that the plant cannot effectively use the water contained in the hydrogel.

On the other hand, it has been reported that, when rice seeds were sown on a hydrogel which had been prepared by causing crosslinked sodium polyacrylate to absorb water, and then the process of the root origination was observed, serious hindrance in the root origination was recognized (Yorio Sugimura, et al., "Utilization of High Water-Absorptive Polymers as Greening Engineering Material," Techniques of Virescence Engineering, 9(2), 11–15, 1983). In this report, however, no hindrance in the root origination was observed when the hydrogel was dialyzed with tap water, but the recovery of the root growth was not observed even when the hydrogel was dialyzed with distilled water. With respect to this phenomenon, in this report, it is presumed that, when the hydrogel is washed or dialyzed with a weak electrolytic solution such as tap water, the water-absorbing force toward the hydrogel was weakened, and the migration of water from the gel to the root hair is facilitated, to thereby solve the hindrance in the root origination.

There has also been reported an example wherein the degree of the elongation of soybean root was markedly inhibited in a soil which had been mixed with a crosslinked sodium polyacrylate hydrogel, as compared with that in the case of a polyvinyl alcohol-type hydrogel (Tomoko Nakanishi, Bioscience & Industry, 52(8), 623–624, 1994). In this reference, this phenomenon is presumably attributable to a fact that the water in the sodium polyacrylate hydrogel is less liable to be utilized by a plant.

As described above, it has heretofore been considered that the inhibition of the growth of a plant in a hydrogel comprising an alkali metal salt of crosslinked polyacrylic acid is attributable to the fact that the water in the hydrogel is not effectively utilized by the plant.

An object of the present invention is to provide a water-retaining support for plants which has solved the above-mentioned problems of the hydrogel water-retaining Another object of the present invention is to provide a water-retaining support for plants which has a water-retaining ability comparable to that of the conventional polyacrylic acid-type hydrogel, and does not substantially cause an inhibition of root origination or of root elongation.

A further object of the present invention is to provide a plant body-growing water-retaining material which has a good water-retaining ability and does not substantially cause inhibition of root origination or of germination of a plant.

As a result of earnest study, the present inventors have found that the effect of a hydrogel is so strong that the inhibition of the root elongation cannot be simply attributable to the effectiveness in the utilization of water in the hydrogel.

As a result of further study based on the above discovery, the present inventors have also found not only that the calcium ion-adsorbing ability in the hydrogel has an important effect on the inhibition of root origination or the inhibition of root elongation of a plant which is in contact with the hydrogel; but also that, in combination with the above-mentioned calcium ion-adsorbing ability, chlorine ions present in the hydrogel also have an important effect on the inhibition of root origination or on the inhibition of root elongation of a plant which is in contact with the hydrogel.

DISCLOSURE OF INVENTION

The present invention relates to a water-retaining support for plants comprising a hydrogel-forming polymer (A) having a calcium ion absorption of 0–100 mg per 1 g of the dry weight thereof, having a chlorine ion content of 0.07–7 mmol per 1 g of the dry weight thereof, and having a water absorption magnification in ion-exchange water at 25° C. of $1.0 \times 10^1$ to $1.0 \times 10^3$; and to a plant body-growing water-retaining material comprising a mixture of such a hydrogel-forming polymer (A) and a plant body-growing support (B). Herein, the "water-retaining support" refers to one in a "dry state" unless otherwise noted specifically. When such a support is distributed or circulated on the market, etc., the support may also be in a "hydrogel" state wherein a part or the entirety of the support retains water therein.

BEST MODE FOR CARRYING OUT THE INVENTION

The reason that the water-retaining carrier for plant according to the present invention has a water-retaining ability comparable to that of the conventional polyacrylic acid-type hydrogel but causes substantially no inhibition of root origination nor inhibition of root elongation of a plant, is not completely clear, but according to the present inventors' knowledge, it is presumed to be as follows.

As a result of experiments, described hereinafter, the present inventors have found a fact that the conventional hydrogel comprising an "alkali metal salt of crosslinked polyacrylic acid" selectively adsorbs heavy metal ions, mainly calcium ions.

In other words, according to the present inventors' experiments, it was presumed that the conventional crosslinked polyacrylic acid-type hydrogel adsorbs ions (mainly comprising calcium ions) in agricultural water (such as well water, tap water, river water, and lake water) and the plant suffers from deficiency of calcium ions; or the hydrogel directly adsorbs ions (mainly comprising calcium ions) from the plant body through its roots, whereby the plant suffers from a deficiency of calcium ions.

As a result of further experiments, the present inventors have also found a fact that when the water-retaining support (or carrier) for plant according to the present invention comprising a hydrogel-forming polymer (A) (having a specific calcium ion absorption amount) is in contact with a plant root, etc., the direct absorption of calcium ions by the water-retaining support from the root based on such contact is effectively suppressed by the chlorine ions present in the water-retaining support. It is presumed that plant water-retaining support according to the present invention which not only has a specific calcium ion absorption amount, but also has a specific chlorine ion content does not substantially cause the inhibition of the root origination nor the inhibition of root elongation on the basis of the combination of the above-mentioned effects.

Hereinbelow, the present invention will be described in detail with reference to the accompanying drawings as desired. In the following description, "%" and "part(s)" representing a quantitative proportion or ratio are those based on weight, unless otherwise noted specifically.

(Water-retaining support)

The water-retaining support according to the present invention comprises a hydrogel-forming polymer (A) having a calcium ion absorption (amount) of 0–100 mg per 1 g of the dry weights thereof, having a chlorine ion content of 0.07–7 mmol per 1 g of the dry weight thereof, and having a water absorption magnification in ion-exchange water of $1.0 \times 10^1$ to $1.0 \times 10^3$ (times) or more. In the present invention, the above-mentioned "calcium ion absorption", "chlorine ion content" and "water absorption magnification in ion-exchange water" may suitably be measured, e.g., by the following method.

(Measurement of Calcium Ion Absorbing Amount)

1 g of a dried water-retaining support is added to 1 L (liter) of aqueous calcium chloride solution having a calcium ion concentration of 200 mg/L. Then, the resultant mixture is left standing for 48 hours in a constant-temperature bath (or thermostatic chamber) at 25° C., while the mixture is stirred occasionally, to thereby cause the water-retaining support to absorb calcium ion while being swollen. The thus swollen water-retaining support is separated from the supernatant, and the calcium ions concentration in the remaining supernatant (excess amount thereof in the above-mentioned aqueous calcium chloride solution) is quantitatively determined by atomic absorption spectrometry (A mg/L).

At this time, in the measurement of the calcium ion analysis by the above atomic absorption spectrometry, the following conditions are preferably usable.

<Measurement conditions for atomic absorption analysis>

Atomic absorption spectrometer: trade name: AA-6500 Auto-System, mfd. by Shimazu Corporation Lighting condition: Ca #8

Electric current: 10 mA/0 mA

Wavelength: 422.7 nm

Slit width: 0.5 µm

On the basis of the thus determined value (A) of the calcium ion concentration, the calcium ion absorption amount per 1 g of the water-retaining support is obtained by the following formula. At the time of the separation of the supernatant from the water-retaining support, there is a possibility that the non-crosslinked water-soluble polymer is dissolved in the supernatant, and therefore it is preferred to effect separation by ultrafiltration using an ultrafilter membrane having a fractionation molecular weight of about 1,000 to 3,000.

Calcium ion absorption amount per 1 g of water-retaining support (mg/g)=200−A

When the calcium ion absorption amount measured by the above-mentioned method exceeds 100 mg per 1 g of the dry weight of the water-retaining support, calcium ion deficiency is liable to occur in a plant which is in contact with the water-retaining support, as shown in Examples appearing hereinafter. In the present invention, the calcium ion absorption is 100 mg or less, per 1 g of the dry weight of the water-retaining support.

(Action of chlorine ions)

In the water-retaining support according to the present invention, the content of chlorine ions in the hydrogel-forming polymer (A) is 0.07–7 mmol per 1 g of the dry weight thereof.

According to the present inventors' knowledge, it is presumed that the phenomenon that the chlorine ions present in the hydrogel according to the present invention suppresses the adsorption of calcium ions from the internal plant body due to the hydrogel by the following mechanism, on the basis of the various experimental data obtained by the present inventors.

Thus, it is considered that the absorption and desorption process of calcium ions by a plant is mainly effected physico-chemically, and is governed by the concentration gradient of calcium ions between the inside and outside of the plant body (for example, "An Outline of Plant Dietetics" (Shokubutu Eiyogaku Taiyo) edited by Kikuo Kumazawa, p 118, Yokendo Co., Ltd., 1974 may be referred to). The calcium ions in the plant body are present in association with chlorine ions, nitrate ions, phosphate ions, hydroxide ions, etc., as counter ions. It is considered that calcium ions in association with the phosphate and hydroxide ions are hardly water-soluble, and therefore do not participate in the absorption and desorption process by the plant.

On the other hand, it is presumed that the calcium ions in association with the nitrate ions are water-soluble, but the nitrate ions which have been absorbed into the plant body are promptly reduced into nitrite ions by nitrate reductase, and are further reduced into ammonium ions by nitrite reductase, and therefore they are not utilized as contour ions for calcium ions (for example, "Introduction to Life Science of Plants" (Shokubutu no Seimei Kagaku Nyuumon) written by Seiichiro Kamisaka, p 138, Baifukan, Co., Ltd., 1991 may be referred to).

Accordingly, there can be made a presumption that the ions closely related to the absorption and desorption process of calcium ions are chlorine ions, and under an electrically neutral condition, the entrance and exit of calcium ions are accompanied with the entrance and exit of chlorine ions.

Herein, when the chlorine ion concentration in the external liquid is higher than the chlorine ion concentration in the plant body, the transport of calcium ions from the internal plant body to the outside of the plant body must be conducted against the gradient of the chlorine ion concentration, whereby the desorption of the calcium ion from the plant body may be suppressed.

On the other hand, when the chlorine ion concentration in the external liquid is lower than the chlorine ion concentration in the plant body, the desorption process of the calcium ions from the plant body may be promoted.

Further, the absorption of calcium by the plant body (reversely to the case of the desorption thereof) is promoted when the chlorine concentration of the external liquid is higher than the concentration of the internal body, and such absorption is suppressed when the chlorine concentration of the external liquid is lower than the concentration of the internal body.

That is, according to the knowledge of the present inventors, it is presumed that calcium ions are liable to be accumulated in the internal plant body when the chlorine ion concentration in the external liquid is higher than the chlorine ion concentration in the internal body liquid, and reversely, the calcium ions are liable to be desorbed to the outside of the plant body when the chlorine ion concentration in the external liquid is lower than the chlorine ion concentration in the internal body liquid.

The above-mentioned "presumptive mechanism" according to the present inventors is supported by a fact that the chlorine ion concentration in the internal plant body is considered to be about 7 mM (for example, Higinbotham, N. B., et al., Plant Physiol. 42, 37,1967 may be referred to). In other words, it is considered that according to the "presumptive mechanism" based on the experimental data obtained by the present inventors, and on the description of the literature that "the chlorine ion concentration in the internal plant body is about 7 mM", the chlorine ion concentration in the exterior liquid body may preferably be at least about 7 mM or more in order to suppress the desorption of calcium from the internal plant body.

Usually, the chlorine ion concentration in agricultural water such as well water, tap water, river water, and lake water to be used for the growth of plants is 1 mM is or less, which is much lower than the chlorine ion concentration in the plant body.

When such agricultural water is absorbed into the hydrogel according to the present invention to thereby swell the hydrogel with the water, the chlorine ion content per 1 g of the dry weight of the hydrogel ("a", mmol/g) required to cause the value of the chlorine concentration in the hydrogel to be a value which is at least not lower than the chlorine concentration in the plant body (usually, about 7 mM) is expressed by the following formula:

$$a = 7 \times b / 1{,}000$$

(wherein "b" denotes the water absorption magnification of the hydrogel).

Herein, the water absorption magnification (B) of the hydrogel support with agricultural water is a numerical value which is dependent on the chemical composition of the hydrogel and the salt concentration in the agricultural water. When the above value "a" is calculated by using the above formula provided that the above value "b" is about 10 times to about 1,000 times, the value "a" is about 0.07 mM/g to about 7 mmol/g. In other words, the "preferred chlorine ion content" (0.07–7 mmol) based on the experimental data of the present inventors is also supported by such calculated values.

As described in Table 1 of [Examples] appearing hereinafter, in the case of a hydrogel having a calcium ion absorption of 100 mg/g or more per 1 g of dry weight thereof and containing no chlorine ion in the hydrogel (commercially available polyacrylic acid salt-type hydrogel described in Comparative Example 6), remarkable growth inhibition in the root and stem were observed.

Further, in a case where the chlorine ion content in the polymer (A) is even in the range of 0.07–7 mmol per 1 g of dry weight thereof, when the calcium ion absorption exceeds 100 mg/g (Comparative Example 7), marked growth inhibition in the roots and stems were observed.

Further, even in a case where the calcium ion absorption is 100 mg/g or less, when no chlorine ion is contained in the gel (Comparative Examples 1–5), marked growth inhibition in the roots and stems were observed.

On the other hand, even in the case of a hydrogel showing a low calcium absorption (63 mg/g), when the chlorine ion concentration in the hydrogel exceeds 7 mmol/g (Comparative Example 8), not only the absorption magnification was markedly lowered and the performance as a water-retaining support is lowered, but also marked growth inhibition in the roots and stems were observed due to salt damage based on a large difference in the chlorine ion concentration between the inside and outside of the plant body.

As shown in Table 1 appearing hereinafter, in the case of the water-retaining support for plant according to the present invention comprising a hydrogel-forming polymer which has a calcium absorption of less than 100 mg/g, and has a chlorine ion content of 0.07–7 mmol/g (Examples 1–4), they suitably function as a water-retaining support for plant without inhibiting the growth of the roots and stems at all.

As described above, in the case of the calcium ion deficiency caused by hydrogels having a calcium absorption and a chlorine ion content both outside of the range according to the present invention (hydrogels based on commercially available polyacrylic acid sodium salt have a high calcium absorption and contain no chlorine ion, as described in Comparative Example 6), the cell membrane structure is destroyed, and many important functions (such as cell division) depending on the membrane structure are stopped or retarded, whereby the root elongation is markedly inhibited in view of the appearance thereof (with respect to the details of such calcium ion deficiency, "Outline of Plant Nutrition science" edited by Kikuo Kumazawa, p 118, Yokendo Co., Ltd., 1974 may be referred to).

(Measurement of chlorine ion content)

0.2 g of a hydrogel-forming polymer in a dry state is immersed in 200 ml of ion exchange water, and left standing for two days. The resultant supernatant is filtrated by a filter, and the chlorine ion concentration in the filtrate is analyzed by an ion analyzer (Ion Analyzer IA-100, mfd. by TOA Electric Wave Industries (TOA Denpa Kogyo)). Based on the thus obtained chlorine ion concentration, the quantity of the chlorine ions contained in 200 ml of the above ion exchange water is determined by calculation, the resultant calculated value is treated as the quantity of chlorine ions in "0.2 g of dry hydrogel-forming polymer".

At this time, in the above chlorine ion analysis by an ion analyzer, the following conditions may suitably be used.

<Measurement conditions for ion analyzer>

Column: PCI-201S for anion (mfd. by TOA Electric Wave Industries) and Card Column PCI-201SG (mfd. by TOA Electric Wave Industries)

Solvent: Eluent Liquid for anion (mfd. by TOA Electric Wave Industries)

Column oven temperature: 40±4° C.

If the "chlorine ion content" measured by the above method is in the range of 0.07–7 mmol per 1 g of dry weight of water-retaining support, it is possible to suppress the "calcium ion deficiency" as shown in Examples appearing hereinafter.

(Measurement of water absorption magnification in ion-exchange water)

A predetermined amount ($W_1$ g) of a dried water-retaining support is weighed, then is immersed in an excess amount (e.g., a weight which is at least 1.5 times the expected water-absorption amount of the above-mentioned water-retaining support) of ion-exchange water (having an electric conductivity of 5 $\mu$S/cm or less), and is then left standing in a constant-temperature bath at room temperature (25° C.) for 2 days (48 hours) whereby the water-retaining support is swollen. An excess amount of water is removed by filtration, and thereafter the weight ($W_2$ g) of the water-retaining support which has absorbed water to be swollen therewith is measured. Then, the water absorption magnification is determined by the following formula:

$$\text{Water absorption magnification} = (W_2 - W_1)/W_1$$

At the time of the measurement of this water absorption magnification, it is preferred to measure the weights $W_1$ and $W_2$ by using a precise electronic balance (for example, LIBROR AEG-220, LIBROR EB-3200-D, mfd. by Shimazu Corporation etc.).

If the water absorption magnification measured by the above-mentioned method is less than 10 (times), it becomes difficult to sufficiently supply water to a plant when a predetermined amount of the water-retaining support is used. In the present invention, the water absorption magnification is 10–100, but the water absorption magnification may preferably be 30–900, more preferably 50–800.

When the water-retaining support according to the present invention is used in combination with water having a relatively low salt concentration such as agricultural water, for example, the water absorption magnification of a hydrogel constituting the support may be improved most effectively by introducing a dissociative ion group into the gel so as to expand the molecular chains in the gel and to simultaneously enhance the internal osmotic pressure in the gel.

(Hydrogel-forming polymer (A))

The hydrogel-forming polymer (A) constituting the water-retaining support according to the present invention refers to a polymer which has a crosslinked or network structure, and has a property such that it can form a hydrogel by retaining water (in the inside thereof) on the basis of such a structure. Further, the "hydrogel" refers to a gel which at least comprises a crosslinked or network structure comprising a polymer, and water (as a dispersion liquid) supported or retained by such a structure.

The "dispersion liquid" retained in the crosslinked or network structure is not particularly limited, as long as it is a liquid comprising water as a main or major component. More specifically, the dispersion liquid may for example be either of water per se, an aqueous solution and/or water-containing liquid (e.g., a mixture liquid of water and a monohydric or polyhydric alcohol).

In the present invention, it is preferred to use a product obtained by crosslinking a water-soluble or hydrophilic polymer compound, as the above-mentioned polymer (A). Such a crosslinked polymer has a property such that it absorbs water in an aqueous solution to be swollen, but is not dissolved therein. The water absorption rate may be changed by changing the kind of the above-mentioned water-soluble or hydrophilic polymer and/or the density (or degree) of crosslinking thereof.

(Water-soluble or hydrophilic polymer compound)

Specific examples of the water-soluble or hydrophilic polymer for providing a hydrogel constituting the water-retaining support according to the present invention may include: methyl cellulose, dextran, polyethylene oxide, polypropylene oxide, polyvinyl alcohol, poly(N-vinyl pyrrolidone), poly(N-vinyl acetamide), polyvinyl pyridine, polyacrylamide, polymethacrylamide, poly(N-methyl acrylamide), polyhydroxymethyl acrylate, polyacrylic acid, polymethacrylic acid, polyvinylsulfonic acid, polystyrenesulfonic acid and their salts, poly(N,N-dimethylaminoethyl methacrylate), poly(N,N-diethylamnioethyl methacrylate), poly(N,N-dimethylaminopropyl acrylamide), and their salts, etc.

(Crosslinking)

As the method of imparting or introducing a crosslinked structure to the above-mentioned polymer compound, there are a method wherein a crosslinked structure is introduced into the polymer at the time of the polymerization of the monomer for providing the polymer; and a method wherein a crosslinked structure is introduced to a polymer after the completion of the polymerization of the monomer. Each of these methods may be used in the present invention.

The former method (i.e., introduction of crosslinking at the time of monomer polymerization) may generally be conducted by utilizing the copolymerization with a bifunctional monomer (or a monomer having three or more functional groups). For example, such a method may be conducted by using a bifunctional monomer including: bis-(meth)acrylamides such as N,N-methylene bis-(meth) acrylates of polyhydric alcohols such as (poly)alkylene glycol, trimethylol propane, glycerin, pentaerythritol, and sorbitol; divinyl compounds such as divinylbenzene; allyloxyalkanes such as tetraallyloxy ethane, and pentaerythritol triallyl ether; etc., singly or as two or more species thereof.

The latter method (i.e., introduction of crosslinking after the monomer polymerization) may generally be conducted by forming a crosslink between molecules by utilizing light, an electron beam, γ-ray irradiation, etc.

Further, the latter method may also be conducted by crosslinking a polymer, e.g., by using, as a crosslinking agent, a multi-functional molecule having a plurality of functional groups (such as isocyanate group, and glycidyl group) which are capable of being bonded to a functional group (such as carboxyl group, and amino group) in the polymer. In this case, it is possible to use a crosslinking agent which is similar to those to be used for surface crosslinking of particles as described hereinafter.

In the present invention, the above-mentioned water absorption rate of the (A) is dependent on the above-mentioned crosslinked structure, particularly the density of crosslinking of the polymer. In general, as the crosslinking density becomes lower, the water absorption rate tends to increase.

In the former method, the crosslinking density may arbitrarily be controlled, e.g., by changing the copolymerization ratio of the bifunctional monomer. In the latter method, the crosslinking density may arbitrarily be controlled, e.g., by changing the quantity of irradiation such as light, an electron beam, and γ-ray irradiation.

In the present invention, the crosslinking density may preferably be in the range of about 0.01 mole % to about 10 mol %, more preferably about 0.05 mol % to about 5 mol %, in terms of the ratio of the moles of the branching point to the moles of all the monomer. Alternatively, when the crosslinked structure is introduced by the former method (introduction of crosslinking at the time of polymerization), the crosslinking density may preferably be in the range of about 0.005 wt. % to about 3 wt. %, more preferably about 0.01 wt. % to about 2 wt. %, in terms of the copolymerization weight ratio of the bifunctional monomer to all the monomers (inclusive of the bifunctional monomer per se).

When the crosslinking density exceeds about 10 mol %, the water absorption magnification of the polymer (A) according to the present invention is decreased, whereby the effect of the polymer (A) as the water-retaining support is decreased. On the other hand, when the crosslinking density is below about 0.01 mol %, the polymer (A) becomes mechanically weak, and the handling thereof becomes difficult.

The crosslinking density (molar ratio of the branching points with respect to all the monomer) may be determined quantitatively, e.g., by $^{13}$C-NMR (nuclear magnetic resonance absorption) measurement, IR (infrared absorption spectrum) measurement, or elemental analysis.

Further, in the polymer (A) constituting the water-retaining support according to the present invention, it is also possible to obtain a better balance between a high water absorption magnification and a high mechanical strength in the polymer (A) by making the crosslinking density higher in the vicinity of the surface than that in the inside thereof (i.e., by introducing so-called "surface crosslinking"). In such an embodiment, the portion having a relatively high crosslinking density in the vicinity of the surface may mainly contribute to the high mechanical strength (and to an improvement in the non-stickiness between support particles), while the portion having a relatively low crosslinking density in the inside may mainly contribute to the high water absorption magnification. Thus, it becomes easy to realize a preferred mechanical strength and a preferred non-stickiness between the particles substantially without decreasing the water absorption magnification.

In view of the balance between the water absorption magnification and mechanical strength, the ratio (Ds/Di) of the highest crosslinking density Ds in the vicinity of the surface to the lowest crosslinking density Di in the inside of the particle in the above-mentioned embodiment may usually be about 2 to 100, more preferably about 5 to 100 (particularly, about 10 to 100).

The crosslinking density in the vicinity of the surface and that in the inside of the particle may be measured by determining the ratio of the presence of the crosslinking agent in the vicinity of the surface and that in the inside of the particle, e.g., according to a local analysis technique such as electron spectroscopy for chemical analysis ESCA (XPS), electron probe microanalysis EPMA, attenuated total reflection (ATR), or secondary ion mass spectrometry SIMS (time-of-flight SIMS (TOF-SIMS), etc.).

In the water-retaining support for plants according to the present invention, when the polymer (A) constituting the support has a high mechanical strength, it becomes easy to keep appropriate voids (or cavities) between the individual support particles, and the presence of the voids may further improve the capability of the support to supply oxygen to the root of a plant.

In the present invention, the method of introducing the surface crosslinking to the polymer (A) is not particularly restricted, and it is possible to use, e.g., various kinds of known methods (or a combination of two or more of such methods).

Particularly, when the polymer (A) in the present invention has a carboxyl group bonded to the polymer chain thereof, it is preferred to use a method wherein a crosslinking agent having at least two functional groups capable of reacting with the carboxyl group is used to crosslink a portion in the vicinity of the surfaces of fine polymer particles. Examples of such a crosslinking agent may include: polyglycidyl compounds having 2–10 epoxy groups per one molecule thereof such as ethylene glycol diglycidyl ether, glycerol diglycidyl ether, and polyglycerol polyglycidyl ether; polyhydric alcohols containing 2–10 carbon atoms such as glycerin and ethylene glycol, alkylene carbonates containing 2–10 carbon atoms in the alkylene group thereof, polyamine resins such as polyamide polyamine epichlorohydrin resin, and polyamine epichlorohydrin resin (molecular weight: about $2\times10^2$–$5\times10^5$), polyvalent isocyanate compounds (as described in JP-A Sho. 59-189103), polyvalent azetidinium compounds (as described in JP-A Hei. 6-287220), etc. These crosslinking agents may used singly or in combination of two or more kinds thereof as desired. Among these, in view of the possibility of a crosslinking reaction at a relatively low temperature, polyglycidyl compounds and polyamine resins may preferably be used.

In the present invention, the shape, size, etc., of the polymer (A) and aggregates of particles are not particularly limited. For example, it is possible to use those in the form powder, granules, lumps (blocks), etc., and it is possible to use those in the sizes of 1 μm to several centimeters.

Depending on the purpose of using these materials, it is possible to appropriately select the shape, size, etc. For example, when the polymer of polymer (A) is used singly, the particle size thereof may preferably be relative large, and the polymer may preferably be in the form of powder of 300–5,000 μm. When it is used in combination with another carrier material, the polymer may preferably be those in the form of powder of 5–1,000 μm.

As the technique for crosslinking the surface of a polymer (A) with the above crosslinking agent, it is possible to use a method wherein a polymer (A) to be surface-crosslinked is dispersed in a large amount of a low-boiling point organic solvent such as alcohol, ketone and ether containing water, and then a crosslinking agent is added to the resultant mixture, to thereby effect crosslinking (JP-A Sho. 57-44627); a method wherein a crosslinking agent is added to a polymer (A) containing water wherein the water content is adjusted to 10 to 40 wt. % to thereby effect crosslinking (JP-A Sho. 59-62665); a method wherein a crosslinking agent and water are absorbed into a polymer (A) in the presence of an inorganic powder, and the resultant mixture is heated with stirring, so as to simultaneously effect crosslinking and removal of water (JP-A Sho. 60-163956); a method wherein 1 wt. part of a polymer (A) is dispersed into a large amount of a hydrophilic inactive solvent having a boiling point of 100° C. or higher, in the presence of inactive inorganic powder and 1.5 to 5.0 wt. parts of water, to thereby effect crosslinking (JP-A Sho. 60-14745); a method wherein a polymer (A) is treated with a crosslinking agent and an aqueous solution containing any of an alkylene oxide adduct of monohydric alcohol, a monovalent salt of organic acid, and a lactam, to thereby effect reaction (JP-A Hei 7-33818); etc.

(Polymer having carboxyl group)

Examples of an embodiment of the polymer (A) having calcium ion absorption suitable for retaining water for a plant and also having a preferred water absorption magnification in ion-exchange water may include, e.g., a polymer (A) having a carboxyl group bonded to the polymer chain thereof wherein the polymer chain is crosslinked, and the content of an alkali metal salt of ammonium salt of the carboxyl group is 0.3 to 7 mmol per 1 g of the polymer.

In the polymer (A), this carboxyl group may be non-neutralized, but may preferably be the former (i.e., one containing alkali metal salt or ammonium salt in an amount of 0.3–7 mmol per 1 g).

This "content of alkali metal salt or ammonium salt of carboxyl group" may preferably be 0.5–6.5 mmol (particularly, 1.0–6.0 mmol). The content of the alkali metal salt of the carboxyl group may preferably be measured, e.g., by the following method.

(Method of measuring content of carboxyl group salt)

A water-retaining support is sufficiently washed with ion exchange water, and then dried. 0.2 g of the dried water-retaining support is weighed in a platinum crucible, is subjected to ashing in an electric furnace, and thereafter the support is dissolved in 5 ml of 1N-hydrochloric acid. Then, distilled water is added to the resultant mixture so as to provide a total volume of 50 ml (constant volume), and the positive ion concentration (D mM) therein is determined according to atomic absorption spectrometry. Since the concentration of the dry water-retaining support in the solution used herein for the atomic absorption analysis is 0.2 g/50 ml=4g/1 L (liter) as described above, the content of carboxyl group salt in 1 g of the dried water-retaining support is calculated as D/4 (mmol).

At this time, in the case of the above positive ion measurement by the atomic absorption spectrometry, conditions similar to those in the case of "calcium ion analysis" as described above can suitably be used.

The conventional hydrogel comprising a crosslinked product of an alkali metal salt of polyacrylic acid has a water absorption magnification which is markedly higher than that of a hydrogel comprising a crosslinked product of a nonionic hydrophilic polymer, and has been used as a water-retaining support in the agricultural field because of such a high water absorption magnification. However, according to the present inventor's experiments, in the hydrogel comprising the crosslinked product of the alkali metal salt of polyacrylic acid which has conventionally been developed as one to be used for agriculture, the content of the introduced dissociative ion groups is very high (e.g., the amount of the introduced alkali metal salt of acrylic acid is about 8 mmol or more per 1 g of the dry resin), whereby the hydrogel has a tendency to adsorb heavy metal ions such as calcium ions which are essential for the growth of a plant, and it markedly inhibits the growth of the plant, as described hereinabove.

In contrast thereto, according to the present inventors' experiments, it has been found that when 0.3 to 7 mmol of a dissociative ion group )e.g., alkali metal salt or ammonium salt of carboxyl group) is introduced into a water-retaining support per 1 g of the dry support, the support shows a water-retaining effect (water absorption magnification in ion-exchange water of 10 to 1,000) which is sufficient for growing a plant without causing deficiency of calcium ions in the plant.

Here, as the alkali metal salt, a sodium salt or a potassium salt is preferred. When the content of the alkali metal salt of carboxyl group is less than 0.3 mmol per 1 g of the dry water-retaining support, it is difficult for the water-retaining support to have a water absorption magnification of 10 or more. On the other hand, when the content of alkali metal salt of carboxyl group exceeds 7 mmol, the calcium ion absorption is liable to exceed 100 mg or more per 1 g of the dry water-retaining support.

(Monomer)

The above polymer (A) may be obtained, e.g., by the ternary polymerization of a monomer (I) having an alkali metal salt or ammonium salt of carboxyl group, a hydrophilic monomer (II), and a crosslinking monomer (III).

Herein, specific examples of the monomer (I) may include alkali metal salts or ammonium salts of acrylic acid, methacrylic acid, maleic acid, itaconic acid, etc. These monomers may be either polymerized as a salt of monomer, or polymerized as a carboxylic acid monomer and then converted into a salt thereof by neutralization after the polymerization. However, the content thereof may preferably be set to 0.3 to 7 mmol per 1 g of the water-retaining support.

Specific examples of the hydrophilic monomer (II) may include acrylic acid, methacrylic acid, maleic acid, itaconic acid, acrylamide, methacrylamide, N-vinylacetamide, etc. When a monomer containing a carboxylic acid is used as the hydrophilic monomer (II), the resultant hydrogel has a tendency to have a low pH value. Accordingly, in this case, the alkali metal salt or ammonium salt content of the carboxyl group may preferably be set to 1.0 to 6.0 mmol per 1 g.

In such a case, it is also possible to convert a portion of the monomer containing the carboxylic acid into calcium salt so as to be copolymerized. According to the present inventors' investigation it has been found that such a calcium salt-type monomer shows an effect of decreasing the calcium ion absorption of the water-retaining support, an effect of avoiding a decrease in pH, and further an effect of accelerating the polymerization.

Specific examples of the crosslinking monomer (III) may include N,N'-methylene bis(meth)acrylamide, N,N'-ethylene bis(meth)acrylamide, ethylene glycol di(meth) acrylate, and diethylene glycol di(meth)acrylate, etc. The amount of the crosslinking monomer (III) to be used may generally preferably in the range of 0.01 to 5 mol %, more preferably in the range of 0.1 to 1 mol % with respect to all the monomers (while somewhat depending on the concentration for the polymerization). When the amount of the monomer to be used is less than 0.01 mol %, the strength of the water-retaining support tends to become insufficient. On the other hand, when the amount of the monomer to be used exceeds 5 mol %, it becomes difficult for the water-retaining support to have a water absorption magnification of 100 or more.

It is also possible to obtain the polymer (A) by the saponification of a copolymer comprising vinyl acetate and maleic anhydride, a copolymer comprising vinyl acetate and acrylic acid (or salt thereof), etc. The thus obtained polymer compound is a polyvinyl alcohol-type polymer. When such a polymer is prepared so as to provide a content of alkali metal salt or ammonium salt of the carboxyl group bonded to the polymer of 0.3 to 7 mmol per 1 g of the dry weight, it is possible to obtain a water-retaining support according to the present invention having a calcium ion absorption of 0–100 mg per 1 g of the water-retaining support and having a water absorption magnification in ion-exchange water of 10 to 1,000.

(Treatment with calcium ions)

The polymer (A) may also be obtained by treating a commercially available polyacrylate-type highly water-absorbing resin with a strong acid or calcium ions. In general, in the commercially available polyacrylate-type highly water-absorbing resin, at least 70% of the carboxyl groups bonded to the polymer chain are in the state of alkali metal salts, and the content thereof is at least about 8 mmol per 1 g of the resin. Therefore, the calcium ion absorption per 1 g of the resin becomes 120 mg or more, and therefore it is inappropriate as the water-retaining support for a plant.

In the present invention, a preferred embodiment is a polymer (A) containing a "polyvalent metal salt of carboxyl group". As the ions of the polyvalent metal salt, there are exemplified, e.g., $Ca^{2+}$, $Mg^{2+}$, $Al^{3+}$, $Ba^{2+}$, $Sr^{2+}$, $B^{3+}$, $Be^{2+}$, $Fe^{2+}$, $Fe^{3+}$, $Mn^{2+}$, etc. Among these, $Ca^{2+}$, $Mg^{2+}$, $Al^{3+}$, $Ba^{2+}$, $Sr^{2+}$, $B^{3+}$, and $Be^{2+}$ are preferred.

The polyvalent metal salt content may be 0.1–7 mmol, preferably 0.5–6.5 mmol, more preferably 1.0–6.0 mmol, per 1 g of the dry weight of the polymer (A). Such a content of the polyvalent metal salt of carboxyl group may preferably be measured, e.g., by the following method.

(Method of measuring content of carboxyl group polyvalent metal salt)

A water-retaining support is sufficiently washed with ion exchange water, and then dried. 0.2 g of the dried water-retaining support is weighed in a platinum crucible, is subjected to ashing in an electric furnace, and thereafter the support is dissolved in 5 ml of 1 N-hydrochloric acid. Then, distilled water is added to the resultant mixture so as to provide a total volume of 50 ml (constant volume), and the calcium concentration (E mM) there is determined according to atomic absorption spectrometry. The content of carboxyl group polyvalent metal salt in 1 g of the dried water-retaining support is calculated as E×(valence number)/4 (mmol). When polyvalent metal ions are mixed, the valence number obtained by subjecting the respective valence numbers of the polyvalent metal ions to "weighed-mean" treatment is used as the valence number of the polyvalent metal ions (e.g., valence number=2 in the case of Mg ions).

When a strong acid such as hydrochloric acid, nitric acid and sulfuric acid, or an aqueous calcium ion solution such as calcium chloride solution and calcium nitrate solution is added to such a commercially available polyacrylate-type highly water-absorbing resin, the alkali metal salt of carboxyl group in the highly water-absorbing resin is substituted by the carboxylic acid or calcium salt of carboxyl group. Therefore, when the amount of the strong acid or calcium ions to be added is appropriately set, the content of alkali metal salt of the carboxyl group bonded to the polymer may be adjusted to 0.3 to 7 mmol per 1 g of the dry water-retaining support, to thereby provide a water-retaining support for plants, according to the present invention, having a calcium ion absorption of 0–100 mg per 1 g of the dry weight and having a water absorption magnification in ion-exchange water of 10 to 1,000.

Here, when the carboxyl group is substituted by the carboxylic acid, the resultant hydrogel has a strong tendency to become acidic. Accordingly, particularly in this case, the content of alkali metal salt of carboxyl group may preferably be adjusted to be 1.0 to 6.0 mmol per 1 g of the dry water-retaining support.

(Method of introducing chlorine ions)

As a method of causing the water-retaining support for plant according to the present invention to contain chlorine ions, it is possible to effect the introduction by causing a polymer (A) to absorb an aqueous solution containing chlorine ions. Further, in the case of synthesizing the polymer (A) in water, it is more preferred to adopt a method of incorporating chlorine ions in this aqueous solution. At this time, the amount of the addition of the chlorine ions is set to a value so that the amount thereof is 0.07–7 mmol per 1 g of dry weight of the water-retaining support for plants to be provided.

The kinds of the counter positive ions with respect to the chlorine ions are not particularly limited, but they may preferably be Na, K, Ca, and $NH_4$ ions. Among these, Na ions may particularly preferably be used.

Further, in a case where the polymer (A) already contains chlorine ions in an amount of 7 mmol or more per 1 g of the dry weight thereof, it is also possible to reduce the content of chlorine ions to a desired set value by washing the polymer (A) with water which contains no chlorine ions (or, water having a low chlorine ion concentration).

Particularly, when a polyacrylic acid salt-type polymer (A) is used as the water-retaining support for plant according to the present invention, it is preferred to utilize a method of forming a crosslinked polymer comprising acrylic acid and an acrylic acid alkali metal salt, and then adding thereto a polyvalent metal salt. Particularly, when calcium chloride, or magnesium chloride, is used as the polyvalent metal salt, it is possible to suppress the Ca absorption amount of the hydrogel, and to introduce chlorine ions into the hydrogel by substituting the alkali metal salt with Ca or Mg.

(Seed germination and germination activity test)

In order to evaluate the effect of a water-retaining support upon a plant, it is preferred to conduct a germination activity test for a seed by using, as a culture medium, the water-retaining support (hydrogel) which has absorbed agricultural water therein. For example, seeds of white radish sprouts (e.g., those sold by Takii Shubyo K. K.) which may easily be subjected to a short-term germination activity test may be used as a seed material, and synthetic water having a typical underground water composition (Table 1) may be used as the agricultural water in the above-mentioned test.

TABLE 1

Composition Of Synthetic Water

| Component | Concentration (mg/L) |
|---|---|
| $Ca(NO_3)_2 \cdot 4H_2O$ | 272 |
| $MgSO_4 \cdot 7H_2O$ | 111 |
| KCl | 22 |
| $NaHCO_3$ | 126 |

(Respective components were dissolved in ion-exchange water at its predetermined concentration, and the pH of the resultant mixture were adjusted to 7 by using hydrochloric acid).

For example, the seed germination activity test may be performed in the following manner. 16 ml of the above-mentioned synthetic water and 160 mg (1 wt. %) of each kind of water-retaining support are introduced into a test tube (having a diameter of 2.5 cm and a height of 15 cm), and the resultant mixture is fully stirred, and then the mixture is left standing for 30 minutes at 25° C., to thereby prepare a gel-like culture medium comprising the water-retaining support which has absorbed the agricultural water therein. 5 grains of the above-mentioned seed of white radish sprouts are uniformly put on the surface of the gel-like culture medium in each of test tubes, and the test tube is capped with a silicone plug having a 6 mm-diameter hole filled with cotton. The thus capped test tube is cultured for 4 days in a culture room (25° C. illumination intensity of 2000 Lux, 16h-daytime), and the resultant germination activity is investigated.

In the above-mentioned germination activity test, for example, the length of the above-ground portion measured as the average stem and leaf length from the base portion (branching point between the roots and stems) of the germinated individual to its leaf tip, while the length of the underground portion may be measured as the average root length from the base portion of the germinated individual to the tip of its main root.

In order to compare the respective germination activity test results more precisely, it is preferred to use a standard hydrogel (the amount of calcium absorption thereof is less than 10 mg/g) as a control sample for the respective germination activity tests, and to express the length of the above-ground portion and the length of the underground portion for the respective hydrogels as relative values (%) with respect to those for the standard hydrogel, as shown in Table 1.

(Method of using water-retaining support)

As the water-retaining support according to the present invention, the polymer (A) may be used either singly or in combination with another plant-growing support (B) as desired.

In the present invention, the plant-growing support (B) is not particularly restricted, but it is possible to use substances which have generally been used as those suitable for plant body-growing support. As substances suitable for plant body-growing, it is possible to use water-insoluble solid-like substances such as powders of inorganic substances and/or organic substances, porous materials, pellet-like materials, fibrous materials and foamed materials. However, in the present invention, various additives as described hereinafter (such as pigments, fertilizers, and anti-blocking agents) are not included in this "plant body-growing support (B)".

The examples of the inorganic substances may include, e.g., inorganic powders (soil, sand, fly ash, diatomaceous earth, clay, talc, kaolin, bentonite, dolomite, calcium carbonate, alumina, etc.); inorganic fibers (rock wool, glass fiber, etc.); inorganic porous materials [filton (Kuntan, porous ceramic), vermiculite, pumice, volcanic ashes, zeolite, silas balloon, etc.]; inorganic foamed materials, (perlite, etc.), etc.

The examples of the organic substance may include, e.g., organic powders [crushed coconut shell, chaff, husk of peanut, husk of orange, wood shavings, wood powder, powder of dry coconut, synthetic resin powder (polyethylene powder, polypropylene powder, ethylene-vinyl acetate copolymer powder]; organic fibers [natural fibers [cellulose-type fibers (cotton, sawdust, straw, etc.) and the like, grass peat, wool, etc.], artificial fibers (cellulose-type fibers such as rayon and acetate), synthetic fibers (polyamide, polyester, acrylic, etc.), pulps [mechanical pulp (ground pulp from logs, Asplund process ground pulp, etc.), chemical pulps (sulfite pulp, soda pulp, sulfate pulp, nitrate pulp, chlorinated pulp, etc.), semi-chemical pulp, regenerated pulps (e.g., mechanically crushed or ground product from papers which have once been produced by forming pulp into papers, or regenerated pulps from waste-papers as mechanically crushed or ground product from waste-papers, etc.)], other wasted materials (waste materials produced from paper diaper, etc.]; organic porous materials (activated carbons coconut shell, etc.); organic foamed materials [cereals, foamed material of synthetic resins or rubbers (polystyrene foamed material, polyvinyl acetal-type sponge, rubber sponge, polyethylene foam, polypropylene foam, urethane foam, etc.), etc.]; organic pellets [pellets of synthetic resins or rubbers, etc.], etc.

The above-mentioned plant body-growing support may be used singly or in combination of two or more species thereof, as desired. Among these, it is preferred to use inorganic porous materials, inorganic foamed materials, organic fibers, rubbers and synthetic resins. The density of the foamed material may preferably by 0.01–1 g/cm$^3$, more preferably 0.01–0.8 g/cm$^3$, particularly 0.01–0.6 g/cm$^3$.

(Organic foamed materials)

With respect to the synthetic resins and/or rubbers constituting the above-mentioned organic foamed materials, it is possible to use those which have been used generally.

More specifically, examples of the rubber may include, e.g., styrene-butadiene rubbers (SBR), butadiene rubbers (BR), isoprene rubbers, butyl rubbers (IIR), ethylene-propylene rubbers, ethylene-propylene non-conjugated diene rubbers, polychloroprene rubbers (CR), nitrile rubbers, acrylonitrile-butadiene rubbers, in addition to the usual natural rubbers (NR).

As the synthetic resin, thermoplastic resins or thermosetting resins may be used.

(Thermoplastic resins)

As the thermoplastic resin, it is possible to use both of soft and hard resins. Examples thereof may include, e.g., ethylene-vinyl acetate copolymers or saponified product thereof, ethylene-acrylic acid salt copolymers, ethylene-acrylic acid ester copolymers, chlorosulfonated polyethylene, chlorinated polyethylene, urethane-type resins, styrene-type resins, vinyl chloride-type resins, olefin-type resins, polyester-type resins, polyamide-type resins, etc. Among these, it is preferred to use those having a flexibility of a certain degree such that the volume thereof can be swollen by water absorption. When a hard resin is used, it is preferred to impart a flexibility to such a resin by using a suitable plasticizer.

Examples of the urethane-type resins may include, e.g., those produced by a method wherein a straight chain-type polyurethane obtained by bulk-polymerizing or solution-polymerizing a polyol, a diisocyanate, and a chain extender is formed into pellets, and then is extrusion molded or injection molded; those produced by a method where a polyurethane solution obtained from solution polymerization is shaped and the solution is removed by evaporation; or those produced by a method wherein such a solution is caused to contact a solidifying medium so that it is solidified.

Examples of the styrene-type resins may include, e.g., styrene polymers, styrene-butadiene-styrene block copolymers, styrene-isoprene-styrene block copolymers, styrene-ethylene-butylene-styrene block copolymers, styrene-ethylene-propylene-styrene block copolymers, etc.

Examples of the vinyl chloride-type resins may include, e.g., high-polymerization degree vinyl chloride resins, partially crosslinked vinyl chloride resins, nitrile rubbers (NBR), urethane resins or blends of polyester resin, etc., and vinyl chloride resin, urethane-vinyl chloride copolymers, nitrile rubber (NBR)-vinyl chloride copolymer, etc.

Examples of the olefin-type resins may include, e.g., polyethylene, polypropylene, mixtures of polyolefin with ethylene-propylene rubber, polymers comprising polyolefin grafted to ethylene-propylene rubber, etc.

Examples of the polyester-type resins may include, e.g., aromatic polyester-polyether block copolymers, aromatic polyester-aliphatic polyester block copolymers, etc.

Examples of the polyamide-type resins may include, e.g., polyether-polyamide block copolymers, polyester-polyamide block copolymer, etc.

The molecular weight of these thermoplastic resins and rubbers are not particularly limited, but they usually have a softening point of 30–300° C., preferably 40–200° C., particularly preferably 50–150° C. These materials may be used singly or as a mixture of two or more species thereof as desired.

(Thermosetting resin)

Examples of the thermosetting resins may include, e.g., those of formalin-condensation resin-type, epoxy resin-type, urethane resin-type, etc.

Examples of the formalin-condensation resin-type may include, e.g., urea resins (reaction products from urea and formalin), melamine resins (reaction products from melamine and formalin), phenolic resins (reaction products from phenol and formalin), resorcinol resins (reaction products from resorcinol and formalin), etc.

Examples of the epoxy resin-type may include, e.g., products obtained by combining a suitable hardening agent and an oligomer having reactive epoxy group(s) at the end thereof, and a molecular weight of several hundred to about 10,000, and hardening the former. More specific examples thereof may include, e.g., reaction products (ratio of epoxy groups and each functional group is a molar ratio of 1:10 to 10;1) obtained from an epoxy resin (epoxy equivalent of 65–1000) such as glycidyl ether-type epoxy resins, glycidyl ester-type epoxy resins, glycidylamine-type epoxy resins, and alicyclic-type epoxy resins, and a hardening agent (such as polyamine, acid anhydride, polyisocyanate, polyol, and polymercaptan).

Examples of the urethane resin-type may include those obtained by a method wherein a straight chain-type polyester, polyether or a polyester amide as a base material is reacted with a polyisocyanate so as to form an NCO-terminated prepolymer (NCO percentage: 1–10%), and a chain extender is reacted with the prepolymer so as to form a polymer, and hardening the polymer by using heat or an appropriate crosslinking agent (prepolymer method); and those obtained by a method wherein a polyol, a diisocyanate, a chain extender, and a crosslinking agent are mixed simultaneously, and are reacted so as to form a polyurethane (one-shot process) (isocyanate/(active hydrogen of polyol, etc.)≈0.8/1 to 10/1). Such a urethane resin may be molded or shaped by, e.g., a casting method, a kneading method.

(Molecular weight)

The number-average molecular weight of the above rubber and thermoplastic resin may usually be $1 \times 10^4$ or more, preferably $2 \times 10^4$ to $100 \times 10^4$. In addition, the number-average molecular weight of the thermosetting resin (before hardening) may usually be $10 \times 10^4$ or less, preferably $5 \times 10^4$ or less. The number-average molecular weight may be measured, e.g., by gel permeation chromatography (GPC method).

In addition, the size of the form of the support (B) is not particularly limited, but the particle size (major axis) of the powder may usually be 1–800 μm, preferably 5–200 μm, and the size of the porous material, fiber and foamed material may usually be 0.001–20 mm, preferably 0.01–10 mm. The size of the pellet may usually be 0.1–50 mm, preferably 0.1–20 mm.

(Ratio of quantity of polymer (A)/support (B))

The weight ratio between the polymer (A) and support (B) in the plant body-growing support water-retaining material according to the present invention may be changed in various ways depending on the kind of the polymer (A), the kind of the support (B), the optimum water content for a plant, but this ratio may usually be 0.1:99.9–80:20, preferably 1:99–75:25, more preferably 5:95–70:30, particularly preferably 10:90–65:35. Usually, when the ratio of the polymer (A) is 0.1 or more, enough water-retaining ability may be provided. It is desirable in view of good formability and an economical point of view to use the material at a ratio of 80 of the polymer (A) or less.

(Binder)

The plant body-growing water-retaining material according to the present invention comprises at least the above-mentioned polymer (A) and the support (B), but it may also comprises a binder (C) as desired.

Examples of the binder (C) may include those which have generally been used, and may be either water-soluble or water-insoluble. When the polymer (A) contains water, it usually has an adhesive property per se. However, it is possible to use the binder (C) as desired, in order to enhance the shaping effect of the polymer (A) and the support (B) depending on the state of water content, shape, specific gravity, etc., of the polymer (A).

The form of the binder (C) is not particularly limited, but it may preferably be one which is to be used at a state at which is has a fluidity corresponding to a viscosity at 25° C. of 1000 Pa.S or less, more preferably 100 Pa.S or less. The binder (C) can be used in a state thereof such that it is dissolved or dispersed, e.g., in a solvent and/or water.

Herein, the above-mentioned "viscosity" may preferably be measured, e.g., under the following conditions.

<Conditions for viscosity measurement>

Machine model: Rotary viscometer, mfd. by Tokyo Keiki Co., Ltd., trade name: BH-type Viscometer Rotor: No. 1 to No. 7 (selected depending on the viscosity)

Number of revolutions of rotor: 2 rpm

The binder may appropriately be selected and used depending on the molding method to be used therefor. Examples of the binder (C) may include, e.g., natural polymers, semi-synthetic polymers, synthetic resins and synthetic rubbers (however, the additive as described hereinafter is not included in this binder (C)).

As the binder (C) which is water-soluble or water-dispersible and is usable in an aqueous system, it is possible to use, e.g., natural polymers on semi-synthetic polymers.

Example of the natural polymer may include, e.g., starch-like material (such as starch); animal proteins (such as gelatine, casein, and collagen); animal proteins (such as soy bean protein, and wheat protein); cellulose-type materials (such as wood cellulose); seaweed extracts (such as agar, and carrageenan); plant seed mucilages (such as guar gum, locust beam gum, tamarind seed gum); plant tree leaf mucilages (such as gum arabic, traganth gum); plant fruit mucilages (such as pectin); microbial mucilages (such as xanthan gum, pullulan, curdlan, dexetrin, gellane gum); plant underground stem mucilages (such as konnyaku mannan), etc.

Example of the semi-synthetic polymer may include cellulose derivatives (such as methyl cellulose, ethyl cellulose, hydroxy ethyl cellulose, ethyl hydroxy ethyl cellulose, carboxymethyl cellulose, methyl hydroxypropyl cellulose); starch derivatives (such as soluble starch, carboxymethyl starch, methyl starch); and alginic acid derivatives (such as alginic acid salts, alginic acid propylene glycol); etc. It is also possible to utilize the thermoplasticity of these substances, instead of utilizing them in an aqueous system. The softening points of these thermoplastic substances are the same as those described above in case of the above-mentioned thermoplastic resin.

As the thermoplastic resin and substances which are soluble or dispersible in a solvent, it is possible to use rubbers and synthetic resins, etc. The examples of the rubbers and synthetic resins may be the same as those as described above in the case of the support (B).

The amount of the binder (C) to be used as desired in the present invention may usually be 0–200 wt. %, preferably 0.5–150 wt. %, particularly 1–50 wt. %, in terms of the solid content thereof, with respect to the total amount of the polymer (A) and support (B).

Production process)

As the process for producing the plant-growing water-retaining support according to the present invention, e.g., the following methods may be used:

(i) a method wherein a mixture comprising the polymer (A), support (B) and optionally the binder (C) which has been mixed under stirring is pressure-molded into a pellet-like shape in a mold having appropriate shape and size;

(ii) a method wherein a mixture is pressure-molded, and is cut and crushed into an appropriate size;

(iii) a method wherein the above-mentioned cut and crushed product is dusted or sprinkled with a polymer (A) and optionally a binder (C), and then is again pressure-molded, and cut and crushed;

(iv) a method wherein a mixture used in the above method (iii) before the pressure molding is pressure-molded into a pellet-like shape in a mold having appropriate shape and size;

(v) a method wherein a material is once pressure-molded into a product in the form of a sheet, rod, or block, and then is cut and crushed into an appropriate size;

(vi) a method wherein a mixture is heat-molded into a product in the form of a sheet, rod, or block, and then is cut and crushed into an appropriate size;

(vii) a method wherein a mixture is heat-molded into a pellet-like shape in a mold having appropriate shape and size;

(viii) a method wherein a mixture is foamed into a product in the form of a sheet, rod, or block, and then is cut and crushed; etc.

In the above methods, it is also possible to further foam the materials, as desired. In addition, it is possible to thicken the hydrogel by adding water in an amount of 1–50% based on the total amount of the polymer (A), support (B) and binder (C) and mixing these materials at the time of mixing of the polymer (A), support (B) and optionally the binder (C).

Among the above-mentioned methods, the methods (ii), (vi), (vii), and (viii) may preferably be used.

The shape of the water-retaining material to be obtained by the above-mentioned method according to the present invention is not particularly limited, but it is usually preferred to obtain the material in the form of a molded product.

Examples of the molded product may include those selected from the group of: pressure-molded pellet-like products; cut or crushed products from the pressure-molded sheet-like material, rod-like material, or block-like material; cut or crushed products from the heat-molded sheet-like material, rod-like material, or block-like material; and cut or crushed products from the foamed sheet-like material, rod-like material, or block-like material. Among these, the products may preferably be cut or crushed products from the pressure-molded or heat-molded sheet-like material, rod-like material, or block-like material; pressure-molded products of pellet-like molded product; or cut or crushed products from the foamed sheet-like material, rod-like material, or block-like material.

(Foamed product)

The plant body-growing water-retaining material according to the present invention can be formed into a foamed product as desired. In the case of obtaining such a foamed product, when the above support (B) is thermoplastic resin and rubber, it can be produced by compounding a foaming agent (and foaming promoter or foaming inhibitor as desired) into the polymer (A), support (B), and then heat-foaming the resultant mixture. Examples of the usable foaming agent may include: diazoamino derivatives, azonitrile, azodicarboxylic acid derivatives, dinitropentamethylene tetramine (DPT), benzene monohydrazol, oxybisbenzene sulphonyl hydrazide (OBBH), ammonium carbonate, ammonium bicarbonate, propane, petroleum ether, etc. These agent may preferably be used in an amount in the range of 1–80 mass part with respect to 100 mass part of the support (B), while it is somewhat different depending on the expansion ratio or usage for the foamed product. In addition, it is possible to mix a plasticizer, a stabilizer, a lubricant, a filler, a coloring agent, a flame retardant, an antistatic agent, or a mildewproofing agent at the time of preparing a mixture of the polymer (A) and support (B) as desired. In addition, when a rubber is used as the support (B), it is possible to mix a rubber reinforcing agent, a tackifier, a processing aid, an antioxidant, an infrared ray-absorbing agent, an aging (ozone) resistor, an agent for rubber such as vulcanizing agent, vulcanizing promoter, vulcanizing aid or activator, etc.

The foaming may be effected by usual one-step foaming or two-step foaming. The density of the resultant foamed product is not particularly limited.

When the above support (B) is a thermosetting resin, e.g., it is sufficient that the polymer (A) and the support (B) are mixed in advance at the time of producing a usual urethane foam so as to foam a urethane resin containing the polymer (A). The procedure for such a process may be the same as that for the production of a usual urethane foam. A usual polyurethane foam may be provided by a one-shot method wherein a polyisocyanate and a polyhydroxyl compound are reacted in one stage in the presence of a foaming agent and an appropriate aid; or by a total prepolymer method wherein a prepolymer which has been obtained by reacting an excess amount of polyisocyanate and a polyhydroxyl compound, is reacted with water in the presence of an appropriate aid; or by a semi-prepolymer method wherein a prepolymer which has been obtained by reacting an excess amount of polyisocyanate and a polyhydroxyl compound, is reacted with an additional amount of a polyhydroxyl compound in the presence of a foaming agent and another appropriate aid. Herein, examples of the foaming agent may include a reactive foaming agent such as water, and another non-reactive foaming agent such as low-boiling point halogenated hydrocarbon. The "other aid" means a catalyst, foaming-regulating agent (bubble stabilizer), a coloring agent, etc.

The above-mentioned mixing device may be any device which is capable of mixing a mixture uniformly. Examples of such a mixing device may include, e.g., a Henschel mixer, a ribbon blender, a planetary mixer, a tumbler, a universal mixer, etc. In addition, examples of the device for kneading a mixture may include, e.g., devices which is capable of effecting kneading operation under heating and shearing force, such as twin-screw extruder, single-screw extruder, co-kneader, Banbury mixer, kneader, and open-roll device.
(Other molding methods)

In the case of pressure-molding method, it is possible to use, e.g., a dry-type pressure-molding method, a direct powder pressure-molding method, a wet-type pressure-molding method, etc. The pressure-molding may be effected by using a roll-type pressure-molding machine (such as briquette machine), a piston-type pressure-molding machine, a screw-type pressure-molding machine, an perforated plate-extruding type molding machine (such as disk-pelletting machine), etc. Among these pressure-molding machines, it is preferred to use a roll-type pressure-molding machine and/or a perforated plate-extruding type molding machine. In addition, the pressurization at the time of the pressure-molding may usually be effected at normal temperature, but may also be effected under heating (for example, at 30–300° C.). It is possible to appropriately select the pressure at the time of the pressure-molding in accordance with the kind, size (particle size), property of the base material, etc., but it is usually 1–3000 kg/ch$^2$, preferably 10–2000 kg/ch$^2$. The shape of the resultant pressure-molded product is arbitrary, and may be, e.g., various kinds of shape such as sheet-like, spherical, cylinder-type plate-type, mass-type, rectangular parallelopiped-type, cone-type, pyramid-type, rod-type, etc. The size of these product may be, e.g., a thickness of 0.1–30 mm in the case of sheet-type, a maximum diameter of 0.1–30 mm in the case of from the spherical type to the rod-type. The size of the cut product may be arbitrary. The size of the crushed product may usually be 0.001–20 mm, preferably 0.01–10 mm. The cutting may be effected by using a known method, such as those using a cutter, a pelletizer, etc. The crushing may be effected by using a known method, such as those using an impact-type crusher (such as pin mil, cutter mil, skillel mill, ACM pulverizer, centrifugal crusher), or an air-type crusher (such as a jet-mill).

In the case of a warming and/or a dry-molding method, it is possible to adopt various methods such as extrusion molding, press molding, a combination of extrusion molding and press molding, and centrifugal molding, without particular limitation. In the case of the extrusion molding as a representative example, a mixture according to the present invention is extrusion-molded into a desired shape, by means of a screw-type vacuum extrusion molding machine, a screw-type extrusion molding machine, a plunger-type molding machine, etc., through a die mounted at the tip of the machine, and the product is cut or crushed into a desired length and size by using a cutter or crusher. The extrusion-molded mixture is then heated and/or dried, to thereby provide an intended molded product. The above drying method can be effected by a known method, e.g., by using gas transmission drying (such as band drying) and ventilation drying (such as air circulation drying), contact drying (drying using a drum-type dryer, etc.) or vacuum or reduced-pressure drying, etc. In addition, the temperature at the time warming and/or dry-molding can appropriately be selected in accordance with the kind, size (particle size), property, etc., of the base material, but may usually be 30–300° C., preferably 50–200° c. In the above procedure, drying may usually be effected at atmospheric pressure, but it is also possible to effect the drying under reduced pressure (750–5 mm Hg). The resultant shape of the heat- and/or dry-molded product may be the same as those in the case of the pressure-molding. The water content of dried product may be 10% or less, preferably 7% or less.
(Other materials)

Further, it is possible use an agent such as fertilizer, agricultural chemicals, insecticide, antibacterial agent, deodorant, flavoring agent, mildewproofing agent, antiseptic, anti-blocking agent, surfactant, etc., in combination with the plant body-growing water-retaining material according to the present invention as desired. It is sufficient that such an agent is present in the plant body-growing water-retaining material according to the present invention, and it is possible to add the agent to the plant body-growing support and/or hydrogel-forming polymer in advance, or to add the agent before or after the molding process for the support or polymer.

The plant body-growing water-retaining material may be colored or not colored, but may preferably be colored by using a pigment and/or dye in view of the visual effect thereof.
(Method of using water-retaining material)

With respect to the method of using the plant body-growing water-retaining material, it is possible to use such a material singly as a planter material, or in a method wherein the water-retaining material is mixed with a cultivating bed material such as soil, a method wherein the water-retaining material is charged into a specific site which is remote from a plant, or a method wherein the water-retaining material is buried in a cultivating bed material at an appropriate depth thereof so as to form a layer of the water-retaining material. In general, the water-retaining material may generally be charged into a portion in the periphery of the seeding site, root-system developing portion, and soil surface layer portion. That is, the plant body-growing water-retaining material according to the present invention may be charged into any portion of soil, as long as a water-retaining layer or an water-retaining mass is formed by using the water-retaining material so that the water content retained by the water-retaining material is effectively utilized by a plant to be cultivated. Further, it is also possible to use the plant body-growing water-retaining material according to the present invention by incorporating such a water-retaining material into another material such as vegetation zone, vegetation mat, vegetation bag, and vegetation plate.

The plant body-growing water-retaining material has a property such that is absorbs water or an aqueous solution (such as aqueous liquid wherein a fertilizer ingredient is dissolved in water) so that it is swollen to have a mass thereof which is preferably 5–200 times, more preferably 10–100 times the mass of the plant body-growing water-retaining material.

The "dispersion liquid" to be retained in a crosslinked or network structure is not particularly limited, as long as it is a liquid comprising water as a main or major component. More specifically, the dispersion liquid may, for example, be either of water per se, an aqueous solution (e.g., aqueous liquid wherein a water-soluble fertilizer ingredient, etc., is dissolved in water), and/or a water-containing liquid (e.g., a mixture liquid of water and a monohydric or polyhydric alcohol).

Hereinbelow, the present invention will be described in more detail with reference to Examples.

EXAMPLE 1

Into a one-liter beaker, 230 g of acrylic acid, 133 g of 48%-aqueous sodium hydroxide solution, 1.0 g of pentaerythritol triallyl ether, and 636 g of water were added, and the resultant mixture was cooled to 10° C. The resultant solution was added to an adiabatic polymerization vessel, was bubbled with nitrogen so as to adjust the dissolved oxygen of the solution to 0.1 ppm (measured by Dissolved Oxygen Meter O220PB (trade name), mfd. by Orient electric Company), and then 0.023 g of 35%-aqueous hydrogen peroxide solution, 0.00575 g of L-ascorbic acid and 0.23 g of potassium persulfate were added thereto. About 30 minute after the addition, polymerization reaction was initiated, and about 2 hours later, the temperature reached the highest value of 72° C. Further, the reaction mixture was matured at this temperature for five hours, to thereby complete the polymerization.

The resultant polymer had a water-containing gel state. This polymer was stirred by a kneader (trade name: BENCH KNEADER PNV-1, mfd. by Irie Shokai; number of revolutions 70 rpm) for about 2 hours to thereby shred the polymer. Further, 35.5 g of 50% aqueous calcium chloride solution was compounded therewith, and the mixture was stirred with a kneader for about 2 hours to be mixed. The resultant product was subsequently heated and dried at 110° C., and was crushed to thereby obtain a water-absorbing resin (hydrogel-forming polymer) having an average particle size of 450 micron (measured by means of Micro-track FRA Particle Size Analyzer (trade name), mfd. by Nikkiso Co.).

EXAMPLE 2

A water-absorbing resin was prepared in the same manner as in Example 1, except that 71 g of 50%-aqueous calcium chloride solution was used instead of 35.5 g of the 50%-aqueous calcium chloride solution at the time of adding the inorganic salt solution to the kneader used in Example 1.

EXAMPLE 3

A water-absorbing resin was prepared in the same manner as in Example 1, except that 106.5 g of 50%-aqueous calcium chloride solution was used instead of 35.5 g of the 50%-aqueous calcium chloride solution at the time of adding the inorganic salt solution to the kneader used in Example 1.

COMPARATIVE EXAMPLE 1

A water-absorbing resin was prepared in the same manner as in Example 1, except that 23.9 g of calcium hydroxide was used instead of 35.5 g of the 50%-aqueous calcium chloride solution at the time of adding the inorganic salt solution to the kneader used in Example 1.

COMPARATIVE EXAMPLE 2

Into a one-liter beaker, 230 g of acrylic acid, 186.7 g of 48%-aqueous sodium hydroxide solution, 1.0 g of pentaerythritol triallyl ether, and 582.3 g of water were added, and the resultant mixture was cooled to 10° C.

The resultant solution was added to an adiabatic polymerization vessel, was bubbled with nitrogen so as to adjust the dissolved oxygen of the solution to 0.1 ppm, and then 0.023 g of 35%-aqueous hydrogen peroxide solution, 0.00575 g of L-ascorbic acid and 0.23 g of potassium persulfate were added thereto. About 30 minutes after the addition, a polymerization reaction was initiated, and about 2 hours later, the temperature reached the highest value of 72° C. Further, the reaction mixture was matured at this temperature for five hours, to thereby complete the polymerization.

The resultant polymer had a water-containing gel state. This polymer was stirred by a kneader for about 2 hours to thereby shred the polymer. Further, 23.9 g of calcium hydroxide was compounded therewith, and the mixture was stirred with a kneader for about 2 hours to be mixed. The resultant product was substantially heated and dried at 110° C., and was crushed to thereby obtain a water-absorbing resin having an average particle size of 450 micron.

COMPARATIVE EXAMPLE 3

A water-absorbing resin was prepared in the same manner as in Example 1, except that 104.9 g of 50%-aqueous calcium nitrate solution was used instead of 35.5 g of the 50%-aqueous calcium chloride solution at the time of adding the inorganic salt solution to the kneader used in Example 1.

COMPARATIVE EXAMPLE 4

A water-absorbing resin was prepared in the same manner as in Comparative Example 2, except that 104.9 g of 50%-aqueous calcium nitrate solution was used instead of 23.9 g of calcium hydroxide at the time of adding the inorganic salt solution to the kneader used in Example 1.

EXAMPLE 4

10 g of commercially available polyacrylic acid-type hydrogel (trade name: Sanfresh ST-500D, mfd. by Sanyo Chemical Industries, Ltd.) was swollen with 4 L of distilled water, and then 1 L of $CaCl_2$ solution (Ca content 1 g, concentration 0.28%) was added thereto, and the resultant mixture was sufficiently stirred. The thus obtained product was left standing for about 2 hours while being occasionally stirred, the resultant gel was filtered by using a mesh (fineness of the mesh: nylon mesh filtration cloth, 250 mesh, mfd. by Asaka Roshi Company, trade name N-No250HD), and the gel was dried in a dryer (120° C.) for one hour. After the drying, the resultant product was crushed by a mortar into gel powder.

COMPARATIVE EXAMPLE 5

10 g of Sanfresh ST-500D used in Example 4 was swollen with 4 L of distilled water, and then 1 L of $Ca(NO_3)_2$ solution (Ca content 1 g) was added thereto, and the resultant mixture was sufficiently stirred. The thus obtained product was left standing for about 2 hours while being occasionally stirred, the resultant gel was filtered by using a mesh, and the gel was dried in a dryer (120° C.) for one hour. After the drying, the resultant product was crushed by a mortar into gel powder.

<Germination activity test using white radish sprouts>

Germination activity tests were conducted with respect to the water-absorbing resins obtained in the above Examples 1–4 and Comparative Examples 1–5 by using white radish sprouts in the manner as described hereinabove. The thus obtained results are shown in the following Table 2.

TABLE 2

Properties of respective samples and results of germination activity tests using white radish sprout

| | Calcium ion absorption (mg/g) | Chlorine ion content (mmol/g) | Water-absorbing magnification (g/g) | Relative values of germination activities (%) (above-ground portion/underground portion) |
|---|---|---|---|---|
| Ex.-1 | 85.4 | 1.6 | 309 | 108/90 |
| Ex.-2 | 62.8 | 1.9 | 210 | 115/93 |
| Ex.-3 | 42.0 | 2.5 | 105 | 108/91 |
| Ex.-4 | 62.9 | 0.6 | 244 | 106/129 |
| Comp. Ex.-1 | 100.0 | 0 | 270 | 73/50 |
| Comp. Ex.-2 | 85.8 | 0 | 430 | 47/46 |
| Comp. Ex.-3 | 47.4 | 0 | 200 | 82/65 |
| Comp. Ex.-4 | 39.8 | 0 | 210 | 61/54 |
| Comp. Ex.-5 | 46.1 | 0 | 155 | 91/64 |
| Comp. Ex.-6 | | | | |
| Sanfresh | 164 | 0 | 302 | 43/7 |
| Acryhope | 150 | 0 | 196 | 38/14 |
| Dia-Wet | 140 | 0 | 172 | 30/11 |
| Sumicagel | 110 | 0 | 326 | 14/8 |
| Comp. Ex.-7 | 110 | 1.0 | 300 | 20/12 |
| Comp. Ex.-8 | 63.0 | 8.1 | 75 | 90/34 |

COMPARATIVE EXAMPLE 6

With respect to four kinds of commercially available polyacrylic acid-type hydrogels (trade name: San-Fresh, mfd. by Sanyo Chemical Industries, Ltd.; Acryhope, mfd. by Nippon Shokubai K.K.; trade name: Diawet, mfd. by Mitsubishi Chemical K.K.; and trade name: Sumicagel, mfd. by Sumitomo Chemical K.K.), the calcium ion absorption, chlorine ion content, and water absorption magnification were measured, and germination activity tests were conducted by using white radish sprouts. The thus obtained results are also shown in Table 1.

COMPARATIVE EXAMPLE 7

10 g Sumicagel used in Comparative Example 6 was added to about 100 ml of a saline solution having a sodium chloride concentration of about 0.6 w %, and stirred sufficiently. When the gel was swollen, and no released water was observed, the product was dried (120° C., for three hours), and then crushed by using a mortar to thereby obtain gel powder.

COMPARATIVE EXAMPLE 8

10 g the hydrogel prepared in Example 4 was added to about 300 ml of a saline solution having a sodium chloride concentration of about 3.0 w %, and stirred sufficiently. When the gel was swollen, the product was dried (120° C., for 5 hours), and then crushed by using a mortar to thereby obtain gel powder.

EXAMPLE 5

"Water-absorbing resin A" (as shown in Table 2) having a calcium ion absorption of 85.4 (mg/g), a chlorine ion content of 1.6 (mmol/g), a water absorption magnification of 309 (g/g) was obtained in the same manner as in Example 1.

Silica sand "Natural Silica Sand No. 4" (particle size 20–65 mesh, mfd. by Tsuchiya Kaolin Co.) and the above water-absorbing resin A were mixed with each other in a weight ratio of 85:15 by using a Henschel mixer at a number of revolutions of 100 rpm, for 15 minutes. Further, the resultant mixture was pressed at 2,000 kg/cm (line pressure) at room temperature, by means of a briquette machine (mfd. by Shinto Kogyo Co.) to thereby obtain a plant body-growing water-retaining material in the form of pellets of about 4 mm in size.

EXAMPLE 6

A plant body-growing water-retaining material was prepared in the same manner as in Example 5, except that "Natural Silica Sand No. 4", "Water-absorbing resin A", and "Ruckstar CB-2" (styrene butadiene rubber, mfd. by Dainippon Ink Co. were used in a mixing weight ratio of 85:15:1, instead of the "Natural Silica Sand No. 4" and "Water-absorbing resin A" in a mixing weight ratio of 85:15 as used in Example 5.

EXAMPLE 7

85 parts of "Natural Silica Sand No. 4", 15 parts of the Water-absorbing resin A prepared in Example 1, and 20 parts of "crushed pulp" were mixed with each other in their powder state by using a Henschel mixer at a number of revolutions of 100 rpm, for 15 minutes. Further, the resultant mixture was uniformly mixed by using a Henschel mixer at a number of revolutions of 100 rpm, for 3 minutes while the mixture was sprayed with 30 parts of water. Then, the resultant mixture was charged into a chopper (trade name: Disk Pelleter, mfd. by Fuji Powdal Co.) so that it was extruded into a rod-shaped product (diameter of 4 mm). This rod-shaped product was cut into 5 mm-long pieces, and thereafter charged into a drier (trade name: Model SPHH-200 Safety Oven, mfd. by Tabai-Espek Co.) so as to be dried at 80° C. for two hours, to thereby obtain a plant body-growing water-retaining material in the form of pellets.

COMPARATIVE EXAMPLE 9

A plant body-growing water-retaining material was prepared in the same manner as in Example 5, except that "Sanfresh ST-500D" was used instead of the "Water-absorbing resin A" used in Example 5.

Sanfresh ST-500D: polyacrylic acid-type hydrogel, average particle size 450 micron, calcium ion absorption 164 (mg/g), chlorine ion content 0 (mmol/g), water absorption magnification of 302 (g/g), mfd. by Sanyo Chemical Industries Co.

[Degree of plant growth (1)]

5 kg of sandy soil (e.g., river sand) was charged into a plastic planter having sizes of 30 cm×20 cm 20×cm.

Soil which had been obtained by adding 1.3 kg of a plant body-growing water-retaining material (each of those of Example 5–7, and Comparative Example 9), and 0.5 kg of a chemical fertilizer (nitrogen:phosphoric acid:potassium= 1:1:1) to 8.7 kg of sand soil, and sufficiently mixing with each other, was charged into the above planter so as to form a layer, and the planter was sufficiently watered. Thereafter, the ease of mixing (i.e., uniformity, prevention of "aggregates" formation) of the plant body-growing water-retaining material into the soil was observed with the naked eye, and cucumber, Japanese radish, and rice plants were respectively seeded into the planters. 50 g of ion exchange water was irrigated every four days, and the states of the growth (mean values of respective 12 stocks) of the respective plants after 14 days were observed.

[Ease of mixing of plant body-growing water-retaining material into soil]

The ease of mixing of the plant body-growing water-retaining material into the soil was observed with the naked eye. The evaluation was conducted according to the following evaluation standards.

○: uniform mixing was observed.

Δ: Slight non-uniformity was observed (i.e., gel blocking was not formed, but slight non-uniformity was recognized by naked-eye observation).

x: Gel blocking was formed, and non-uniform mixing was observed.

Degree of plant growth (1) tests were conducted by using the plant body-growing water-retaining materials obtained in the above Examples 5–7 and Comparative Example 9 in the same manner as described above. The thus obtained results are shown in the following Table 3.

TABLE 3

| | Degree of growth of above-ground portion (cm) | | | Easiness of mixing of plant-growing water-retaining material into soil |
|---|---|---|---|---|
| | Cucumber | White radish | Rice | |
| Ex. 5 | 12.0 | 9.1 | 12.1 | ○ |
| Ex. 6 | 11.8 | 9.0 | 12.5 | ○ |
| Ex. 7 | 11.5 | 8.0 | 10.2 | ○ |
| Comp. Ex. 9 | 2.0 | 1.8 | 1.3 | x |

EXAMPLE 8

"Perlite No. 3" (obsidian, mfd. by Nihon Cement Co.), "Water-absorbing resin A prepared in Example 5", and "Powder Resin EVA5015M" (thermoplastic EVA resin, mfd. by Tokyo Ink Mfg. Co.) were mixed with each other in a weight ratio of 10:1:5. 200 g of the resultant mixture was charged into a pot having a capacity 250 cc, the surface of the mixture was flattened. Further, the mixture was heated at 140° C. for 30 minutes, and then was cooled to room temperature, to thereby prepare a plant body-growing water-retaining material having a shape-retaining property.

EXAMPLE 9

"Perlite No. 3" (obsidian, mfd. by Nihon Cement Co.), "Water-absorbing resin A prepared in Example 5", and "Elastolan ET1040" (thermoplastic urethane resin, mfd. by Takeda Birdische Urethane Co.) were mixed with each other in a weight ratio of 10:1:5 by means of a mixer (trade name: Omni Mixer Model OM-5, mfd. by Chiyoda Technical Industry Corporation) at a number of revolutions of 100 rpm for ten minutes. 200 g of the resultant mixture was charged into a pot-type container (material: pottery) having a capacity 250 cc, the surface of the mixture was flattened by using a spatula. Further, the mixture was heated at 140° C. for 30 minutes so as to soften the above thermoplastic urethane resin, and then was cooled to room temperature, to thereby prepare a plant body-growing water-retaining material having a shape-retaining property.

EXAMPLE 10

"Water-absorbing resin B" (as shown in Table 2) having a calcium ion absorption of 62.9 (mg/g), a chlorine ion content of 0.6 (mmol/g), a water absorption magnification of 244 (g/g) was obtained in the same manner as in Example 4. Further, a plant body-growing water-retaining material having a shape-retaining property was prepared in the same manner as in Example 9 except that the above "Water-absorbing resin B" was used instead of the "Water-absorbing resin A" prepared in Example 5" as used in Example 9.

EXAMPLE 11

"Perlite No. 3" (obsidian, mfd. by Nihon Cement Co.), "Water-absorbing resin A prepared in Example 5", and "ES-Fiber" (polyethylene-polypropylene composite fiber, average fiber length 500 micron, fiber diameter 5 micron, Chisso Co.) were mixed with each other in a weight ratio of 10:1:5 in the same manner as in Example 10. 200 g of the resultant mixture was charged into a pot having a capacity 250 cc, the surface of the mixture was flattened. Further, the mixture was heated at 140° C. for 30 minutes so as to soften the above ES-Fiber, and then was cooled to room temperature, to thereby prepare a plant body-growing water-retaining material having a shape-retaining property.

EXAMPLE 12

"Perlite No. 3" (obsidian, mfd. by Nihon Cement Co.), "Water-absorbing resin A prepared in Example 5", and "Sanprene SEL No. 23" (NCO-terminated urethane resin, mfd. by Sanyo Chemical Industries, Ltd., liquid state) were mixed with each other in a weight ratio of 10:1:5 in the same manner as in Example 10. 200 g of the resultant mixture was charged into a pot having a capacity 250 cc, the surface of the mixture was flattened. Further, the mixture was left standing at room temperature so as to harden the above NCO-terminated urethane resin, to thereby prepare a plant body-growing water-retaining material having a shape-retaining property.

COMPARATIVE EXAMPLE 10

A plant body-growing water-retaining material was prepared in the same manner as in Example 8, except that "Sanfresh ST-500D" was used instead of the "Water-absorbing resin A" prepared in Example 5.

COMPARATIVE EXAMPLE 11

A plant body-growing water-retaining material was prepared in the same manner as in Example 11, except that "Sanfresh ST-500D" was used instead of the "Water-absorbing resin A" prepared in Example 5.

[Degree of plant growth (2)]

Each of the plant body-growing water-retaining materials having a shape-retaining property (each of those of Examples 8–12, and Comparative Example 10 and 11) was immersed in a fertilizer solution (Hyponex 20-20-20, 1 g/L, mfd. by Hyponex Japan Co.) so that the material fully absorbed water. The upper surface of each sample was strongly pushed by a finger-tip so as to form concavities therein (diameter about 5 mm×depth 15 mm). Seeds (cucumber, Japanese radish, and rice; one seed per one concavity) were placed into the thus formed concavities, and the water-absorbed water-retaining material around the circumference of the concavities was broken down so as to cover each seed. 50 g of exchange water was irrigated every four days, and the states of the growth (mean values of respective 6 stocks) of the respective plants after 14 days were observed.

Degree of plant growth (2) tests were conducted by using the plant body-growing water-retaining materials obtained in the above Examples 8–12 and Comparative Example 10 and 11 in the same manner as described above. The thus obtained results are shown in the following Table 4.

TABLE 4

| | Degree of growth of above-ground portion (cm) | | |
|---|---|---|---|
| | Cucumber | White radish | Rice |
| Ex. 8 | 10.3 | 8.0 | 11.6 |
| EX. 9 | 10.5 | 8.6 | 12.0 |
| Ex. 10 | 11.0 | 9.0 | 12.2 |
| Ex. 11 | 10.0 | 8.0 | 10.0 |
| Ex. 12 | 10.6 | 7.6 | 10.0 |
| Comp. Ex. 10 | 0.8 | 0.2 | 1.7 |
| Comp. Ex. 11 | 0.5 | 0.2 | 1.3 |

EXAMPLE 13

100 parts of the above-mentioned "Water-absorbing resin A prepared in Example 5" was added to 100 parts of a thermoplastic urethane resin (trade name: Elastolan ET1040, mfd. by Takeda Birdische Urethane Co.), and the mixture was kneaded at 150° C. for 10 minutes by using an open-roll, and was press-molded at 180° C. by means of a machine (trade name: Shind-type SF type Oil Pressure Press, mfd. by Sindo Kyogyo Co.) to thereby obtain a sheet having a thickness of 1.5 mm. This sheet was cut by means of a pelletizer (trade name: Pelletizer SGG-220, mfg. by HORAI K.K.) to thereby prepare a plant body-growing water-retaining material in the form of 1.5 mm rectangular pellets.

EXAMPLE 14

A plant body-growing water-retaining material was prepared in the same manner as in Example 13, except that a "styrene-type thermoplastic resin" (trade name: Taftec H1052, mfd. by Asahi Kasei Kogyo Co.) was used instead of the "thermoplastic urethane resin" as used in Example 13.

EXAMPLE 15

A plant body-growing water-retaining material was prepared in the same manner as in Example 13, except that a "polyolefin-type thermoplastic resin" (trade name: TPE3570, mfd. by Sumitomo Chemical Co.) was used instead of the "thermoplastic urethane resin" as used in Example 13.

EXAMPLE 16

A plant body-growing water-retaining material was prepared in the same manner as in Example 13, except that a "ethylene-vinyl acetate copolymer" (trade name: Evatate R5011, mfd. by Sumitomo Chemical Co.) was used instead of the "thermoplastic urethane resin" as used in Example 13.

EXAMPLE 17

The water-absorbing resin A of Example 5, styrene-butadiene rubber (SBR, trade name: Exxonbutyl 268, mfd. by Exxon Chemical Co.) and a foaming agent dinitropentamethylene tetramine) were used, and these materials according to the following mixing ratio were kneaded for 10 minutes by means of an open-roll machine, to thereby prepare a sheet having a thickness of 3 mm. The thus obtained sheet was charged into a metal mold and was pressurized by means of a press at 145° C. for 20 minutes, the metal mold was removed and the product was cooled, to thereby prepare a foamed product (density 0.2 g/ml). Thereafter, the resultant foamed product was cut to thereby prepare 1.5 mm-rectangular chips.

SBR 50 parts

Water-absorbing resin A 50 parts

Zinc oxide 2.5 parts

Powder sulfur 1.0 part

Promoter (DM; dibenzothiazyl disulfide) 1.0 part stearic acid 0.5 part

Paraffin 1.0 parts

Foaming agent (DPT) 1.5 parts

COMPARATIVE EXAMPLE 12

A plant body-growing water-retaining material was prepared in the same manner as in Example 13, except that "San-Fresh ST-500MPS" was used instead of the "Water-absorbing resin A" used in Example 13.

Sanfresh ST-500MPS: polyacrylic acid-type hydrogel, average particle size 35 micron, calcium ion absorption 164 (mg/g), chlorine ion content 0 (mmol/g), water absorption magnification of 302 (g/g), mfd. by Sanyo Chemical Industries Co.

[Degree of plant growth (3)]

Each of the plant body-growing water-retaining materials having a shape-retaining property (each of those of Examples 13–17, and Comparative Example 12) was immersed in a fertilizer solution (Hyponex 20-20-20, 1 g/L, mfd. by Hyponex Japan Co.) so that the material fully absorbed water, and thereafter, charged into a flowerpot (material: pottery) having a capacity of 1L, and the surface of the material was leveled. The upper surface of each of the thus obtained samples was strongly pushed by a finger-tip so as to form concavities therein. Seeds (cucumber, Japanese radish, and rice; one seed per one concavity) were placed into the thus formed concavities, and the water-absorbed water-retaining material around the circumference of the concavities was broken down so as to cover each seed. 50 g of exchange water was irrigated every four days, and the states of the growth (mean values of respective 6 stocks) of the respective plants after 14 days were observed.

The water absorption magnification and degree of plant growth (2) tests were conducted by using the plant body-growing water-retaining materials obtained in the above Examples 13–17 and Comparative Example 12 in the same manner as described above. The thus obtained results are shown in the following Table 5.

TABLE 5

|  | Water absorption magnification (g/g) | Degree of growth of above-ground portion (cm) | | |
| --- | --- | --- | --- | --- |
|  |  | Cucumber | White radish | Rice |
| Ex. 13 | 35 | 10.6 | 7.6 | 10.0 |
| Ex. 14 | 20 | 10.0 | 8.0 | 10.0 |
| Ex. 15 | 23 | 10.3 | 8.0 | 11.6 |
| Ex. 16 | 40 | 10.5 | 8.6 | 12.0 |
| Ex. 17 | 60 | 11.0 | 9.0 | 12.2 |
| Comp. Ex. 12 | 32 | 0.8 | 0.2 | 1.7 |

Industrial Applicability

When the water-retaining support for plant according to the present invention is used, since the water-retaining support absorbs therein only a small amount of calcium ions and has a suitable chlorine ion content, a plant does not suffer from calcium ion deficiency. In addition, since the water absorption magnification of such a support is sufficiently large, the support can supply sufficient water to a plant.

Since the plant body-growing water-retaining material according to the present invention does not obstruct the growth of a plant, and is excellent in water-absorbing ability, such a material can supply sufficient water to a plant. In addition, since the above material can be processed into various shapes by using a light-weight base material instead of natural soil, the weight of the planting material can largely be reduced.

Based on the above effects, the water-retaining support for plant and plant body-growing water-retaining material according to the present invention can support or hold a plant at the time of the growth of the plant and can also function as a source for supplying water to the plant. More specifically, these materials can supply water to a plant without inhibiting the growth of the plant, when the support is used as a water-retaining support and plant body-growing water-retaining material for fluid seeding, farm cultivation, field cultivation, virescence engineering, etc.

The water-retaining support for plant and plant body-growing water-retaining material according to the present invention are effectively usable as a planting material for "pot-type" products such as cell-type shaped seedlings, community pot seedlings, and pot-type seedlings, the production and circulation of which have rapidly been increased, particularly in protected horticulture under structures. In addition, when an inorganic material and an organic synthetic resin/rubber are used as a plant body-growing water-retaining material, such a material can be a completely synthetic material, whereby the propagation of microbes therein, and the decay thereof can easily be controlled.

Further, the water-retaining support for plant and plant body-growing water-retaining material according to the present invention may easily be formed into a product which is beautiful in its appearance and is clean, as compared with those of the conventional natural supports and water-retaining materials, and therefore the support and material according to the present invention can effectively be utilized as a planting material for indoor type plants.

What is claimed is:

1. A water-retaining support for plants comprising a polymer (A) having a calcium ion absorption of 0–100 mg per 1 g of the dry weight thereof, having a chlorine ion content of 0.07–7 mmol per 1 g of the dry weight thereof and having a water absorption magnification in ion-exchange water at 25° C. of $1.0 \times 10^1$ to $1.0 \times 10^3$.

2. A water-retaining support for plants according to claim 1, wherein the polymer (A) is a polymer having a carboxyl group bonded to the polymer chain thereof, and the content of alkali metal salt or ammonium salt of the carboxyl group is 0.3 to 7 mmol per 1 g of the dry weight of the support.

3. A water-retaining support for plants according to claim 1, wherein the polymer (A) is a polymer comprising at least 3–17 mmol of a carboxyl group bonded to the polymer chain thereof per 1 g of the dry weight thereof, and the content of alkali metal salt or ammonium salt of the carboxyl group is 0.3 to 7 mmol per 1 g of the dry weight of the support.

4. A water-retaining support for plants according to claim 3, wherein the polymer (A) is a polyacrylic acid-type polymer.

5. A water-retaining support for plants according to claim 3, which further comprises a polyvalent metal salt of a carboxyl group.

6. A water-retaining support for plants according to claim 1, wherein the polymer (A) is surface-crosslinked.

7. A water-retaining support for plants according to claim 1, wherein the counter ion to the chlorine ion is Na, K, Ca and/or $NH_4$ ion.

8. A plant body-growing water-retaining material comprising a mixture of a polymer (A) and a plant body-growing support (B), the polymer (A) having a calcium ion absorption of 0–100 mg per 1 g of the dry weight thereof, having a chlorine ion content of 0.07–7 mmol per 1 g of the dry weight thereof and having a water absorption magnification in ion-exchange water at 25° C. of 10 to 1000.

9. A plant body-growing water-retaining material according to claim 8, which has been shaped into a molded product.

10. A plant body-growing water-retaining material plant according to claim 8, wherein the polymer (A) is a polymer having a carboxyl group bonded to the polymer chain thereof, and the content of alkali metal salt or ammonium salt of the carboxyl group is 0.3 to 7 mmol per 1 g of the dry weight thereof.

11. A plant body-growing water-retaining material plant according to claim 8, wherein the polymer (A) is a polymer comprising at least 3–17 mmol of a carboxyl group bonded to the polymer chain thereof per 1 g of the dry weight thereof.

12. A plant body-growing water-retaining material plant according to claim 8, wherein the support (B) is a rubber and/or a synthetic resin.

13. A plant body-growing water-retaining material plant according to claim 8, which further comprises a binder (C).

14. A plant body-growing water-retaining material plant according to claim 9, wherein the molded product is selected from the group consisting of: pressure-molded pellet-like products; cut or crushed products from the pressure-molded sheet-like material, rod-like material, or block-like material; cut or crushed products from the heat-molded sheet-like material, rod-like material, or block-like material; and cut or crushed products from the foamed sheet-like material, rod-like material, or block-like material.

15. A plant body-growing water-retaining material plant according to claim 9, wherein the molded product is a foamed molded product.

16. A water-retaining support for plants according to claim 4, which further comprises a polyvalent metal salt of a carboxyl group.

17. A water-retaining support for plants comprising a polymer (A) comprising at least 3–17 mmol of a carboxyl group bonded to the polymer chain thereof per 1 g of the dry weight thereof, wherein the content of alkali metal salt or ammonium salt of the carboxyl group is 0.3 to 7 mmol per 1 g of the dry weight of the support, the polymer (A) having a calcium ion absorption of 0–100 mg per 1 g of the dry weight thereof, having a chlorine ion content of 0.07–7 mmol per 1 g of the dry weight thereof and having a water absorption magnification in ion-exchange water at 25° C. of $1.0 \times 10^1$ to $1.0 \times 10^3$.

18. A water-retaining support for plants according to claim 17, which further comprises a polyvalent metal salt of a carboxyl group.

19. A water-retaining support for plants comprising a polymer (A) having a calcium ion absorption of 0–100 mg per 1 g of the dry weight thereof, having a chlorine ion content of 0.07–7 mmol per 1 g of the dry weight thereof and having a water absorption magnification in ion-exchange water at 25° C. of $1.0 \times 10^1$ to $1.0 \times 10^3$, wherein the counter ion to the chlorine ion is Na, K, Ca and/or $NH_4$ ion.

20. A plant body-growing water-retaining material comprising a mixture of a polymer (A) and a plant body-growing support (B), the polymer (A) having a calcium ion absorption of 0–100 mg per 1 g of the dry weight thereof, having a chlorine ion content of 0.07–7 mmol per 1 g of the dry weight thereof, having a water absorption magnification in ion-exchange water at 25° C. of 10 to 1000, and having a carboxyl group bonded to the polymer chain thereof, wherein the content of alkali metal salt or ammonium salt of the carboxyl group is 0.3 to 7 mmol per 1 g of the dry weight thereof.

21. A plant body-growing water-retaining material comprising a mixture of a polymer (A) and a plant body-growing support (B), the polymer (A) being a polymer comprising at least 3–17 mmol of a carboxyl group bonded to the polymer chain thereof per 1 g of the dry weight thereof, having a calcium ion absorption of 0–100 mg per 1 g of the dry weight thereof, having a chlorine ion content of 0.07–7 mmol per 1 g of the dry weight thereof and having a water absorption magnification in ion-exchange water at 25° C. of 10 to 1000.

22. A plant body-growing water-retaining material comprising a mixture of a polymer (A) and a plant body-growing support (B) comprising a rubber and/or a synthetic resin, the polymer (A) having a calcium ion absorption of 0–100 mg per 1 g of the dry weight thereof, having a chlorine ion content of 0.07–7 mmol per 1 g of the dry weight thereof and having a water absorption magnification in ion-exchange water at 25° C. of 10 to 1000.

23. A plant body-growing water-retaining material comprising a mixture of a polymer (A), a plant body-growing support (B) and a binder (C), the polymer (A) having a calcium ion absorption of 0–100 mg per 1 g of the dry weight thereof, having a chlorine ion content of 0.07–7 mmol per 1 g of the dry weight thereof and having a water absorption magnification in ion-exchange water at 25° C. of 10 to 1000.

24. A water-retaining support for plants comprising a polyvalent metal salt of a carboxyl group and a polyacrylic acid-type polymer (A) having a calcium ion absorption of 0–100 mg per 1 g of the dry weight thereof, having a chlorine ion content of 0.07–7 mmol per 1 g of the dry weight thereof and having a water absorption magnification in ion-exchange water at 25° C. of $1.0 \times 10^1$ to $1.0 \times 10^3$.

* * * * *